US008055078B2

(12) United States Patent
Choi et al.

(10) Patent No.: US 8,055,078 B2
(45) Date of Patent: Nov. 8, 2011

(54) FILTER FOR BLOCKING IMAGE-BASED SPAM

(75) Inventors: Jaesik Choi, Savoy, IL (US); Ke Wei, Palo Alto, CA (US); Vishwanth Tumkur Ramarao, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 924 days.

(21) Appl. No.: 12/039,310

(22) Filed: Feb. 28, 2008

(65) Prior Publication Data
US 2009/0220166 A1 Sep. 3, 2009

(51) Int. Cl.
*G06K 9/62* (2006.01)
*G06F 15/16* (2006.01)
(52) U.S. Cl. .................. 382/209; 382/219; 709/206
(58) Field of Classification Search .............. 382/209, 382/219; 709/206
See application file for complete search history.

(56) References Cited

U.S. PATENT DOCUMENTS

| 6,658,423 | B1 | 12/2003 | Pugh et al. | |
|---|---|---|---|---|
| 7,373,385 | B2 | 5/2008 | Prakash | |
| 7,817,861 | B2 * | 10/2010 | Lee | 382/209 |
| 7,882,177 | B2 * | 2/2011 | Wei et al. | 709/204 |
| 2008/0178288 | A1 * | 7/2008 | Alperovitch et al. | 726/22 |

OTHER PUBLICATIONS

Foo, Jun Jie et al., "Detection of Near-Duplicate Images for Web Search," CIVR, Jul. 2007, 8 pages.
Shen, Heng Tao et al., "UQLIPS: A Real-Time Near-Duplicate Videp Clip Detection System," VLDB, Sep. 2007, pp. 1374-1377.
"Perceptron," Wikipedia, http://en.wikipedia.org/w/index.php?title=Perceptron&printable=yes, accessed Feb. 10, 2008, 5 pages.
Gionis, Aristides et al., "Similarity Search in High Dimensions via Hashing," Proceedings of the 25th VLDB Conference, 1999, Edinburgh, Scotland, pp. 518-529.
"Near Duplicate Algorithms," Wikipedia, http://en.wikipedia.org/w/index.php?title=Near_Duplicate_Algorithms&printable=yes, accessed Feb. 28, 2008, 8 pages.
Chum, Ondrej et al., "Scalable Near Identical Image and Shot Detection," CIVR Jul. 2007, 8 pages.

* cited by examiner

*Primary Examiner* — Tom Y Lu
(74) *Attorney, Agent, or Firm* — Frommer Lawrence & Haug LLP; John W. Branch

(57) ABSTRACT

A network device and method are directed towards detecting and blocking image spam within a message by employing a weighted min-hash to perform a near duplicate detection (NDD) of determined features within an image as compared to known spam images. The weighting for the min-hash is determined based on employing a machine learning algorithm, such as a perceptron, to identify an importance of each bit in a signature vector of the image. The signature vector is generated by extracting a shape of text in the image using a Discrete Cosine Transform, extracting low-frequency characteristics using a high-pass filter, and then performing various morphological operations to emphasize the shape of the text and reduce noise. Selected feature bits are extracted from the lowest frequency and intensity bits of the resulting signal to generate the signature vector used in the weighted min-hash NDD.

20 Claims, 14 Drawing Sheets

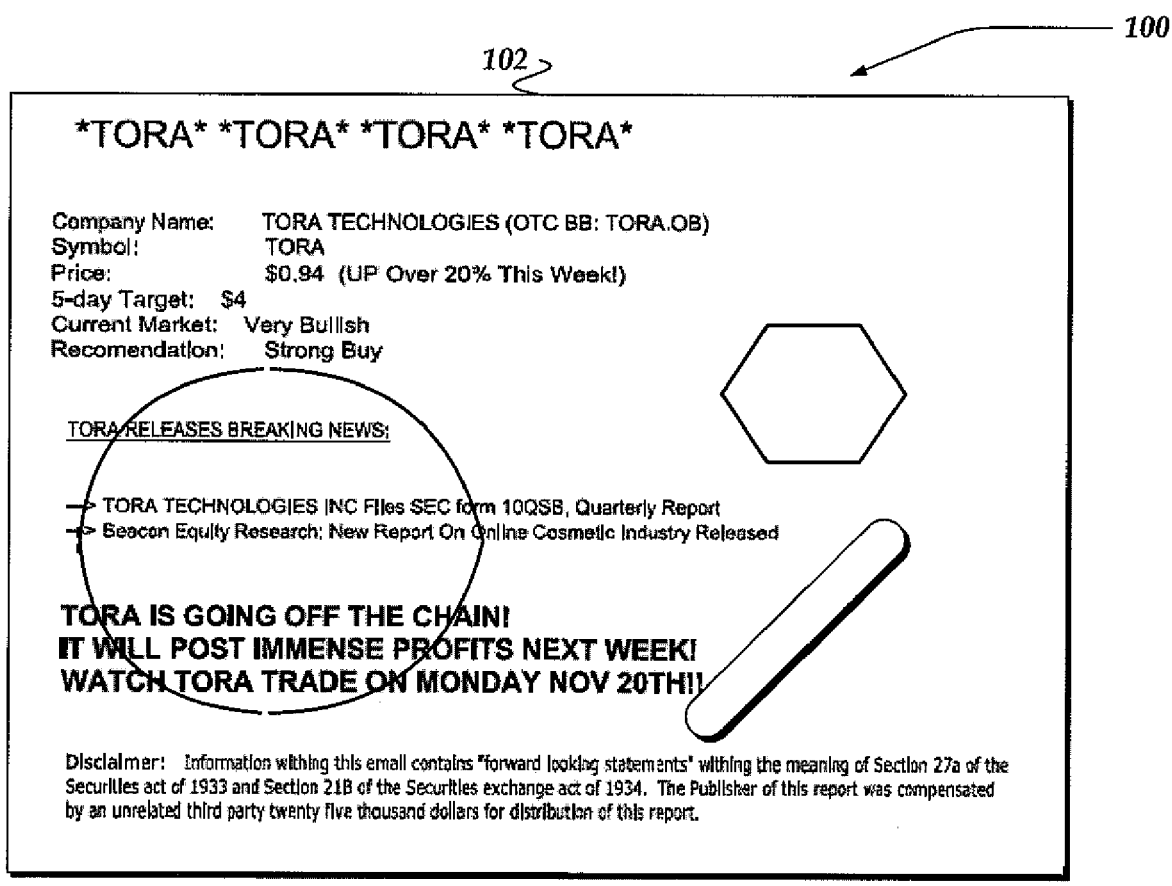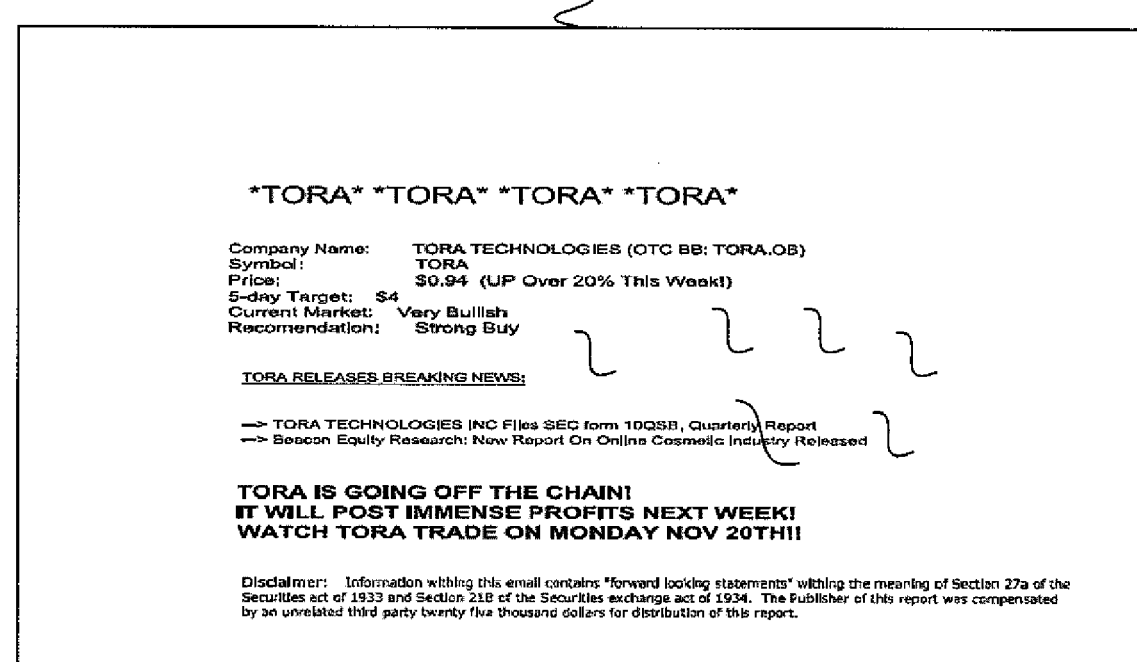
Fig. 1

```
% weight_vector = perceptron(InputSamples,TrainingRate) Given Input, a set of training input
% vectors of the form   [X0,X1,...Xn-1,Class], where X0 is a constant 1 and Class is -1 for Class 0 or
% +1 for class1, and a TrainingRate = (0,1] returns weight a vector of the form
% [W0,W1,...Wm] : m = n-1 such that the weight vector dichotomizes Input. If the training samples
% are not linearly seperable it does not terminate. In other words, it determines (approximates) a
% weight vector such that W0 + W1*X1 + ,..., + Wm*Xn-1 = 0
function w = perceptron(Input,win,rate, n)
    Ip = Input(:,1:end-1); % Ip: the sample x's
    c  = Input(:,end);     % c: vector of corresponding classes
    [r,cols] = size(Ip);   % cols: number of columns in Ip
    w{1} = rand(1,cols)';  % create random weight vector of size cols
%   w{1} = win;
    k = 2;                 % using 1-based indexing set k to 2

% while there exist input vectors in Ip that are missclassified
    % by w{k-1} pick a missclassifed Ij in Ip and adjust w{k-1} by delta w
    % to get w{k}
%   ret= misclassified(Ip,w{k-1},c,r, 0);
%   i = ret(1);
    i = 1;
    min_val = 70000;
        pw = w{1};
    pw(1:size(win, 2)) = win';
    while i
        xk = c(i)*Ip(i,:);
%       i, c(i)
        nw = pw + n*xk';
        for j=1:cols
            if ( nw(j) > 0 )
                nw(j) = 0;
            end
        end
        k = k + 1;
        ret = misclassified(Ip,nw,c,r, rate, 1);
        i = ret(1);
        rat = ret(2);
        if ( min_val > ret(3) )
            min_val = ret(3)
        end
        if ( mod( k, 100 ) == 0 )
            ret = misclassified(Ip, nw, c, r, rate, 1 );
            i = ret(1);
            rat = ret(2);
%           k, i, rat, ret(3)
        end
        pw = nw;
    end
    rat
    w = nw'; % return the column vector
```

```
% result = misclassified(I,w,c,n)
% returns the index of the first misclassified input vector
% in I if no input vectors in I are misclassifed returns 0
   function result = misclassified(I,w,c,n, rate, f)
%      result = 0;
      first = 0;
      cnt = 0;
      ij = I * w;

for i = 1:n
         idx = int32( floor( rand * ( n - 0.01 ) ) ) + 1;
         if (ij(idx) <= -2 && c(idx) ~= -1) || (ij(idx) > -2 && c(idx) ~= 1)
            cnt = cnt + 1;
            wrong(cnt) = idx;
            if ( cnt == 1 )
               first = idx;
            end
            if ( f == 0 && cnt > 500 )
               rat = cnt * 100 / i;
               n_ex = wrong(int32(floor(rand * (cnt-0.1))) +1);
               result = [n_ex, rat, cnt];
               return;
%              result = [first, 100];
%              return;
            end
%           result = i;
%           return;
         end
      end rat = cnt * 100 / n;
      if ( cnt < n * rate)
         result = [0, rat, cnt];
      else
         n_ex = wrong(int32(floor(rand * (cnt-0.1))) +1);
         result = [n_ex, rat, cnt];
      end
```

*Fig. 9B*

FILTER FOR BLOCKING IMAGE-BASED SPAM

TECHNICAL FIELD

The present invention relates generally to computing security, and more particularly but not exclusively to detecting and blocking image spam within a message by obtaining a signature vector for an image and comparing the signature vector to other signature vectors from a training database of known image spam using a weighted min-Hash to detect near-duplicate detection, using a perceptron learning algorithm to generate the weighting.

BACKGROUND

The problem of spam in established communication technologies, such as electronic mail, is well-recognized. Spam may include unsolicited messages sent by a computer over a network to a large number of recipients. Spam includes unsolicited commercial messages, but spam has come to be understood more broadly to additionally include unsolicited messages sent to a large number of recipients, and/or to a targeted user or targeted domain, for malicious, disruptive, or abusive purposes, regardless of commercial content. For example, a spammer might send messages in bulk to a particular domain to exhaust its resources.

One type of spam message includes image spam. Image spam employs a technique in which the sender (typically a spammer) might include the spam as part of an embedded file attachment rather than in the body of the message. Image spam may include an image file, such as a GIF file, or the like, typically a quantity of random words, sometimes known as word salad, and maybe even a link to a website. An image spammer may use a combination and/or variation of these components to bypass traditional anti-spam technologies.

These images are often automatically displayed to a recipient of the message. Unfortunately, much of such image spam remains hidden or undetected as spam from today's spam filters. The increase in more complex image spam within messages has caused spam capture rates across the messaging security industry to decline, often resulting in wasted productivity and end-user frustration as more spam gets delivered.

FIG. 1 illustrated examples of typical image spam 102-103. To an end-user recipient, the content of a message, image spam 102-103 might appear as a text-based message. Many spammers may use such image spam with links (e.g., URL links) embedded within the message or directly in the image spam, such as illustrated within image spam 103. One of the goals of the spammer is to have an end-user 'click' on the link, so that the end-user may be directed to a website that may be trying to sell something, phish for personal information, or even install spyware, mal-ware, or the like, on the end-user's computer.

Moreover, images can be gathered from remote locations using, for example, HTML IMG tags to display images loaded from a website when a message is viewed. Other variations of image spam may have embedded images that direct end-users to enter a URL address into a browser. Where there is no communication with any external source, this type of spam may evade URL block list type filters.

In addition, spammers often automatically generate image spam that may include virtually the same text, but appear as completely different images. For example, the spammers might change dimensions, spacing, or coloring of an image so that the image appears unique to traditional spam analysis. Spammers may employ a variety of image generation tools, for example, to randomize such characteristics while keeping substantially the same text.

To further confuse many of the traditional spam filters today, spammers may insert random characters and speckles, and even reuse an image to create a large number of slightly different images. Speckling allows the spammers, for example, to reuse a base image and add what looks like random bits of lint or speckles to the image, which often may appear to filters as unique images effectively evading fingerprinting, or other detection approaches. Another kind of image spam technique uses several colors making the text more difficult to recognize when using, for example, optical character recognition (OCR) techniques. Varying font colors may further hide spam type of words within an image. Recently, animated images and strip mining are techniques being used by image spammers to further evade traditional spam filters. Animated images with transparent frames are even sometimes used to build up spam images. Sometimes, an image spammer may even build an image spam from a plurality of distinct layers that may effectively evade traditional spam detection filters.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein:

FIG. 1 shows examples of possible image spam that may be received within a message;

FIG. 9A-9B illustrate a pseudo-code generally showing one embodiment of an overview of a perceptron employed to generate the weighting vector for process 700 of FIG. 7;

DETAILED DESCRIPTION

Figure 2:
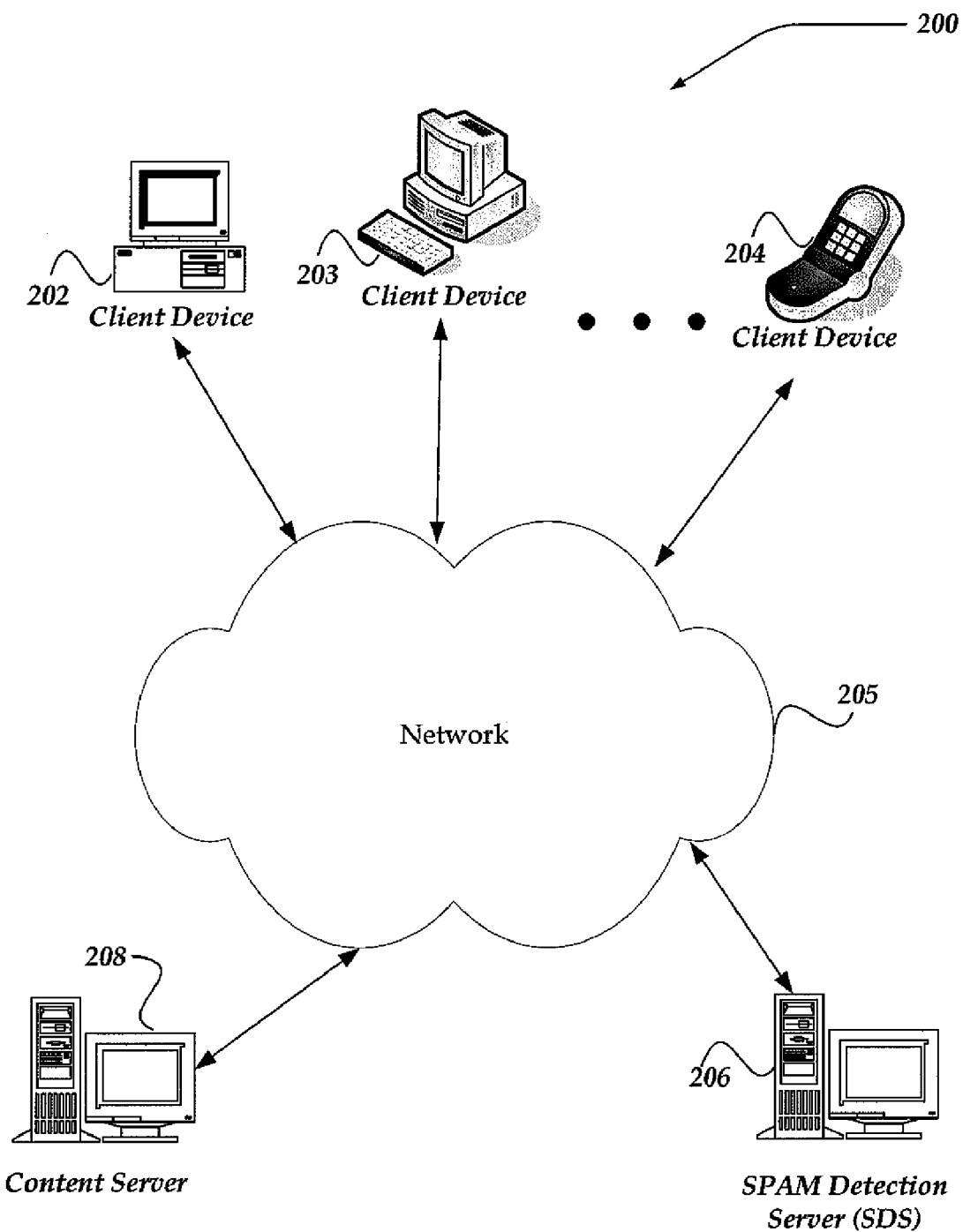
FIG. 2 shows a functional block diagram illustrating an environment for use in detecting image spam.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards detecting and blocking image spam within a message by performing statistical analysis on differences in text distribution patterns to distinguish text spam images from text legitimate images. In one embodiment, a server having an image spam detection component receives a message having an image attachment. Physical characteristics of image attachment are initially examined to determine whether the image is a candidate for further analysis. If so, then the image may be resized to enable consistent comparisons across images, and to improve processing efficiency. Although images may be resized to virtually any size, in one embodiment, the resizing is to a 128×128 image. A shape of the text is extracted using a Discrete Cosine Transform (DCT), which is passed through a high-pass filter to extract low frequency features of the image. The output is then processed using various morphological operations as described below, including clearing and dilation, in the spatial domain to emphasize the shape of the text and to reduce noise. The results may then be quantized in the frequency domain using another DCT, to compress the information in the frequency domain. Where a bit value is greater than a D.C. value, then the bit may be assigned a 1 value, otherwise, the bit is assigned a zero value. A signature vector is then generated by extracting a defined number of bits from the lowest frequencies, and another set of bits from the intensity feature of the image. In one embodiment, the signature vector is generated as a 125 bit signature vector with 119 bits from the frequency features and 6 bits from the intensity feature of the image.

Similar activities are performed on a known set of image spam, called the training images. A weighting vector, or sometimes called a magic vector, is determined using a machine learning algorithm, such as a perceptron, to identify an importance of each feature bit. The trained importance of each feature bit, as determined from the weighting vector, is then used to lookup within a hash table to determine whether the current image includes text spam. This may be achieved using a weighted min-hash near duplicate detection (NDD) approach, where the min-hash is weighted using the weighting vector. If there is determined a near duplicate to at least one known spam image in the training images, then the message may be blocked, the image purged from the message, or any of a variety of other actions. By employing a weighting vector, the present invention recognizes that some feature bits in a signature vector may have more relevancy or importance than other bits. This is unlike traditional approaches that assume equal importance to each bit, and thereby may have increased false positive or false negative detections.

The invention is not constrained however to statistically examining the shape of text for an image. For example, other characteristics of the image may also be employed, including, without limit, intensity, size data of the image, a single dimension of the image, or the like. Moreover, results for the various characteristics may be combined and statistically analyzed to detect whether the image is image spam.

In one embodiment, user feedback may be employed to identify images that may have been incorrectly identified as spam (e.g., false positives). Based, in part, on trusted user feedback, a digital signature based exemption may be applied such that the improperly identified image will be properly allowed when it is next received within a message.

Although the image spam detection mechanism may be implemented within a messaging server, the invention is not so limited. Thus, for example, in one embodiment, the image spam detection mechanism may also be implemented within a client device, integrated within a client messaging application, or the like.

As may be seen below, various embodiments of the invention proposes a compact representation of spam images that may be efficient from images of over 12K bytes to images as small as 16 to 125 bytes, using an efficient and effective encoding approach that employs the intensity of an image to generate a signature vector. Moreover, the approach described herein provides a general framework which is able to automatically learn an importance of various features within an image based on a training data set of images by employing a machine learning algorithm, such as a perceptron, or other neural network approaches. Such approach therefore scales readily to include other features of an image beyond frequency and/or intensity features. In addition, by employing the machine learning algorithm to generate a weighting vector that emphasizes the importance of particular bits in a signature vector, use of traditional min-hash algorithms for near duplicate detection may be improved.

Illustrative Environment

FIG. 2 is a functional block diagram illustrating an exemplary operating environment 200 in which the invention may be implemented. Operating environment 200 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 200 includes client devices 202-204, network 205, content server 208, and SPAM Detection Server (SDS) 206. Client devices 202-204 are in communication with each other, content server 208, and SDS 206 through network 205. Content server 208 and SDS 206 may also be in communication with each other through network 205.

One embodiment of a client device is described in more detail below in conjunction with FIG. 3. Briefly, however, client devices 202-204 may include virtually any computing device capable of receiving and sending a message over a network, such as network 205, to and from another computing device. The set of such devices described in one embodiment below generally includes computing devices that are usually considered more specialized devices with limited capabilities and typically connect using a wireless communications medium such as cell phones, smart phones, pagers, radio frequency (RF) devices, infrared (IR) devices, Citizen's-Band Radios (CBs), integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 202-204 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 202-204 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like.

Client devices 202-204 may be further configured with a browser application that is configured to receive and to send content in a variety of forms, including, but not limited to markup pages, web-based messages, audio files, graphical files, file downloads, applets, scripts, text, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Network 205 is configured to couple client devices 202-204, with each other, and/or other network devices. Network 205 is enabled to employ any form of computer readable media for communicating information from one electronic device to another. In one embodiment, network 205 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (TSDNs), Digital Subscriber Lines (DSLs), wireless links including satellite links, or other communications links known to those skilled in the art.

Network 205 may per employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, and future access networks may enable wide area coverage for network devices, such as client device 204, and the like, with various degrees of mobility. For example, network 205 may enable a radio connection through a radio network access such as Global System for Mobil communication (GSM), General Packet Radio Services (GPRS), Enhanced Data GSM Environment (EDGE), Code Division Multiple Access (CDMA), Wideband Code Division Multiple Access (WCDMA), or the like.

Furthermore, remote computers and other related electronic devices could be remotely connected to either LANs or WANs via a modem and temporary telephone link. In essence, network 205 includes any communication method by which information may travel between client devices 202-204, SDS 206, and/or content server 208.

Additionally, network 205 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Content server 208 includes virtually any network computing device that is configured to provide various resources, including content and/or services over network 205. Content server 208 may provide content and/or services for any of a variety of activities, including, but not limited to merchant businesses, financial businesses, insurance businesses, educational, governmental, medical, communication products, and/or services, or virtually any other site of interest. Many of such activities may communicate over the internet using a variety of mechanisms, including, but not limited to email, webpages, IM, SMS, or the like.

Content server 208 may include an interface that may request sensitive information from a user of client devices 202-204. For example, content server 208 may provide access to an account, which may request user log-in information. Such log-in information may include a user name, password, an entry of a key number, or the like. In another example, content server 208 may request other sensitive information, such as a credit card number, medical information, or the like. For example, content server 208 may operate as a merchant site that on at least one webpage of its website, there is a request for entry of sensitive information, including financial information, or the like. In one embodiment, a webpage may include a form, or virtually any other data entry mechanism. Moreover, content server 208 may instead, or in addition to requesting sensitive information from a user, provide one or more web pages that may be associated with an advertisement, blog, or the like, for which a content owner might seek to have a user of client devices 202-204 to be redirected towards. Thus, in at least one embodiment, content server 208 might represent a legitimate content service. However, in another embodiment, content server 208 might represent a phishing site, advertisement site, pornography site, gambling site, or the like. Therefore, in one embodiment, a message might be sent to one of client devices 202-204 that includes a link to a web page hosted within content server 208. Moreover, the message may include the link along with image spam, and/or within the image spam.

Devices that may operate as content server 208 include, but are not limited to personal computers, desktop computers, multiprocessor systems, microprocessor-based or programmable consumer electronics, network PCs, servers, network appliances, and the like.

One embodiment of SDS 206 is described in more detail below in conjunction with FIG. 4. Briefly, however, SDS 206 includes virtually any network device that is configured to receive a message and to statistically determine whether the message includes image spam based on comparisons of signature vectors of known spam images to the received image within the message. As described herein, SDS 206 may be configured to employ a weighted min-hash near duplicate detection of the received image's signature vector to the signature vectors of the known spam images. If, based on the comparison, SDS 208 determines that the message includes image spam, SDS 206 may be configured and arranged to perform any of a variety of preventative actions. For example, SDS 206 may block the message from being sent towards its destination, expunge the message of the determined image spam and allow the message to be sent, provide an alert message to the destination, an Administrator, or the like. SDS 206 may employ a process substantially similar to that described below in conjunction with FIGS. 5-9.

SDS 206 may also include a message server that is configured to receive messages and route them to an appropriate client device, or the like. Thus, SDS 206 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, and the like. However, SDS 206 may also include a message server configured and arranged to manage other types of messages, including, but not limited to SMS, MMS, IM, or the like.

Although SDS 206 is illustrated as a distinct network device, the invention is not so limited. For example, a plurality of network devices may be configured to perform the operational aspects of SDS 206. For example, in one embodiment, the image spam diction may be performed within one or more network devices, while the message server aspects may be performed within one or more other network devices. In any event, devices that may operate as SDS 206 include, but are not limited to personal computers, desktop computers, multiprocessor systems, microprocessor-based or programmable consumer electronics, network PCs, servers, network appliances, and the like.

Illustrative Client Device

Figure 3:
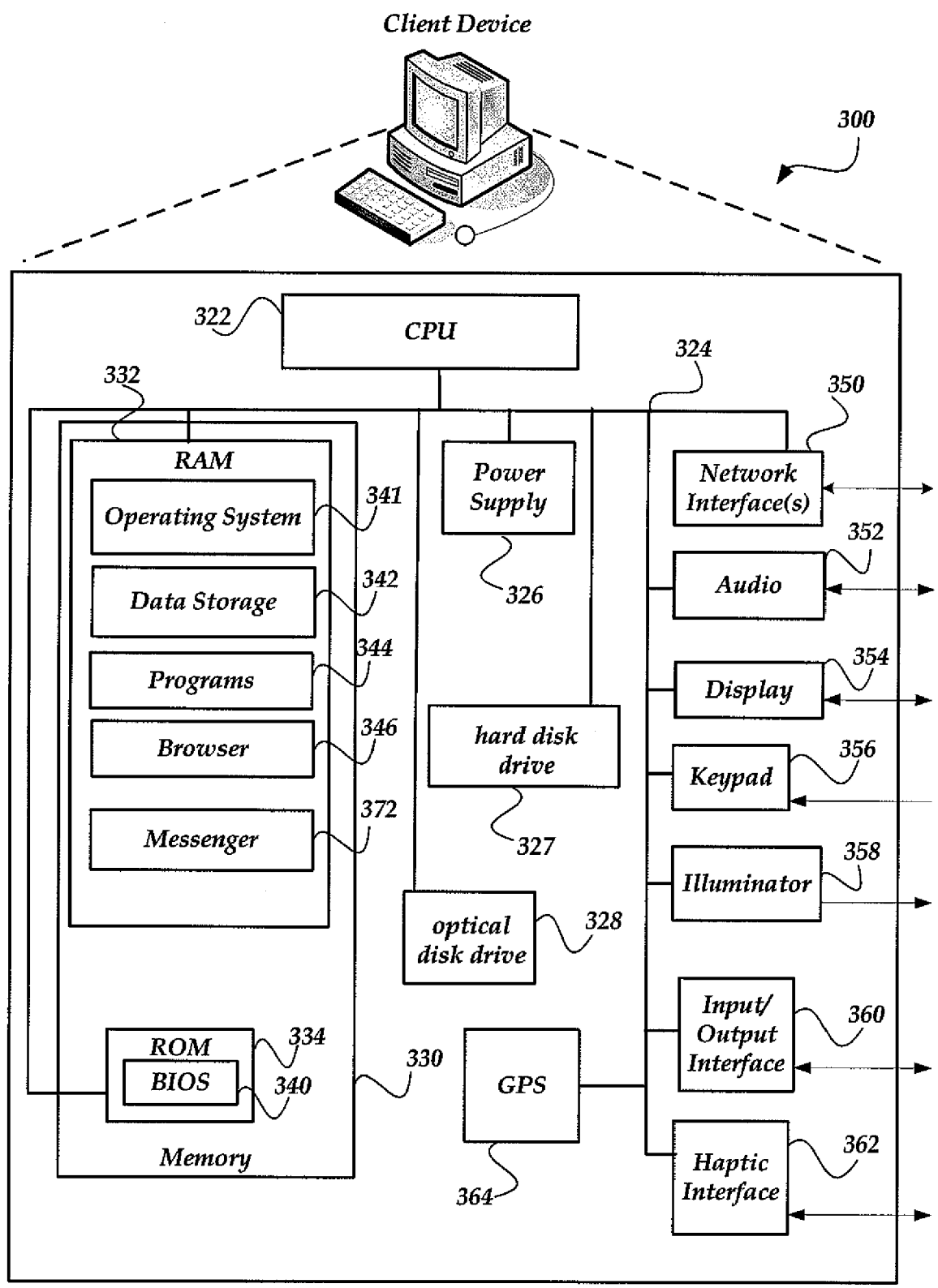
FIG. 3 shows one embodiment of a client device that may be employed within the environment illustrated in FIG. 2.

FIG. 3 shows one embodiment of client device 300 that may be included in a system implementing the invention. Client device 300 may represent one embodiment of client devices 202-204 of FIG. 2.

Client device 300 may include many more or less components than those shown in FIG. 3. However, the components shown are sufficient to disclose an illustrative embodiment for practicing the present invention. As shown in the figure, client device 300 includes a processing unit 322 in communication with a mass memory 330 via a bus 324.

Client device 300 also includes a power supply 326, one or more network interfaces 350, an optional audio interface 352, a display 354, a keypad 356, an illuminator 358, an input/output interface 360, an optional haptic interface 362, and an optional global positioning systems (GPS) receiver 364. Power supply 326 provides power to client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another computing device. Network interface 350 includes circuitry for coupling client device 300 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 352 is arranged to produce and receive audio signals such as the sound of a human voice, music, or the like. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Client device 300 may further include additional mass storage facilities such as optical disk drive 328 and hard disk drive 327. Hard disk drive 327 is utilized by client device 300 to store, among other things, application programs, databases, and the like. Additionally, optical disk drive 328 and hard disk drive 327, a flash memory, or the like may store cookies, data, images, or the like.

Keypad 356 may comprise any input device arranged to receive input from a user (e.g. a sender). For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions.

Client device 300 also comprises input/output interface 360 for communicating with external devices, such as a headset, mouse, stylus, or other input or output devices. Input/output interface 360 can utilize one or more communication technologies, such as USB, infrared, Bluetooth™, and the like. Optional haptic interface 362 is arranged to provide tactile feedback to a user (e.g. a sender) of the client device. For example, the haptic interface may be employed to vibrate client device 300 in a particular way when another user of a computing device is calling.

Optional GPS transceiver 364 can determine the physical coordinates of client device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS and the like, to further determine the physical location of client device 300 on the surface of the Earth. It is understood that under different conditions, GPS transceiver 364 can determine a physical location within millimeters for client device 300; and in other cases, the determined physical location may be less precise, such as within a meter or significantly greater distances.

Mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 240 for controlling low-level operation of client device 300. The mass memory also stores an operating system 341 for controlling the operation of client device 300. It will be appreciated that this component may include a general purpose operating system such as a version of UNIX, or LINUX™, or a specialized client communication operating system such as Windows Mobile™, or the Symbian® operating system. The operating system may include an interface with a Java virtual machine module that enables control of hardware components and/or operating system operations via Java application programs.

Memory 330 further includes one or more data storage 342, which can be utilized by client device 300 to store, among other things, programs 344 and/or other data. For example, data storage 342 may also be employed to store information that describes various capabilities of client device 300. The information may then be provided to another device based on any of a variety of events, including being sent as part of a header during a communication, sent upon request, and the like. Moreover data storage 342 may be used to store information such as data received over a network from another computing device, data output by a client application on client device 300, data input by a user of client device 300, or the like. For example, data storage 342 may include data, including cookies, and/or other client device data sent by a network device. Data storage 342 may also include image files, or the like, for display and/or use through various applications. Data storage 342 may also include received messages, attachments to messages, as well as messages to be sent to another computing device, or the like. Moreover, although data storage 342 is illustrated within memory 330, data storage 342 may also reside within other storage mediums, including, but not limited to optical disk drive 228, hard disk drive 327, or the like.

Programs 344 may also include computer executable instructions which, when executed by client device 300, transmit, receive, and/or otherwise process messages and enable telecommunication with another user of another client device. Other examples of application programs include calendars, contact managers, task managers, transcoders, database programs, word processing programs, security programs, spreadsheet programs, games, CODEC programs, and so forth. In addition, mass memory 330 stores browser 346, and messenger 372.

Browser 346 may be configured to receive and to send web pages, forms, web-based messages, and the like. Browser 346 may, for example, receive and display (and/or play) graphics, text, multimedia, audio data, and the like, employing virtually any web based language, including, but not limited to Standard Generalized Markup Language (SMGL), such as Hyper-Text Markup Language (HTML), a wireless application protocol (WAP), a Handheld Device Markup Language (HDML), such as Wireless Markup Language (WML), WMLScript, JavaScript, and the like.

Messenger 372 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 372 may be configured as an IM application, such as AOL Instant Messenger, Yahoo! Messenger, .NET Messenger Server, ICQ, or the like. In one embodiment messenger 372 may be configured to include a mail user agent (MUA) such as Elm, Pine, MH, Outlook, Eudora, Mac Mail, Mozilla Thunderbird, or the like. In another embodiment, messenger 372 may be a client application that is configured to integrate and employ a variety of messaging protocols.

Illustrative Server Environment

Figure 4:
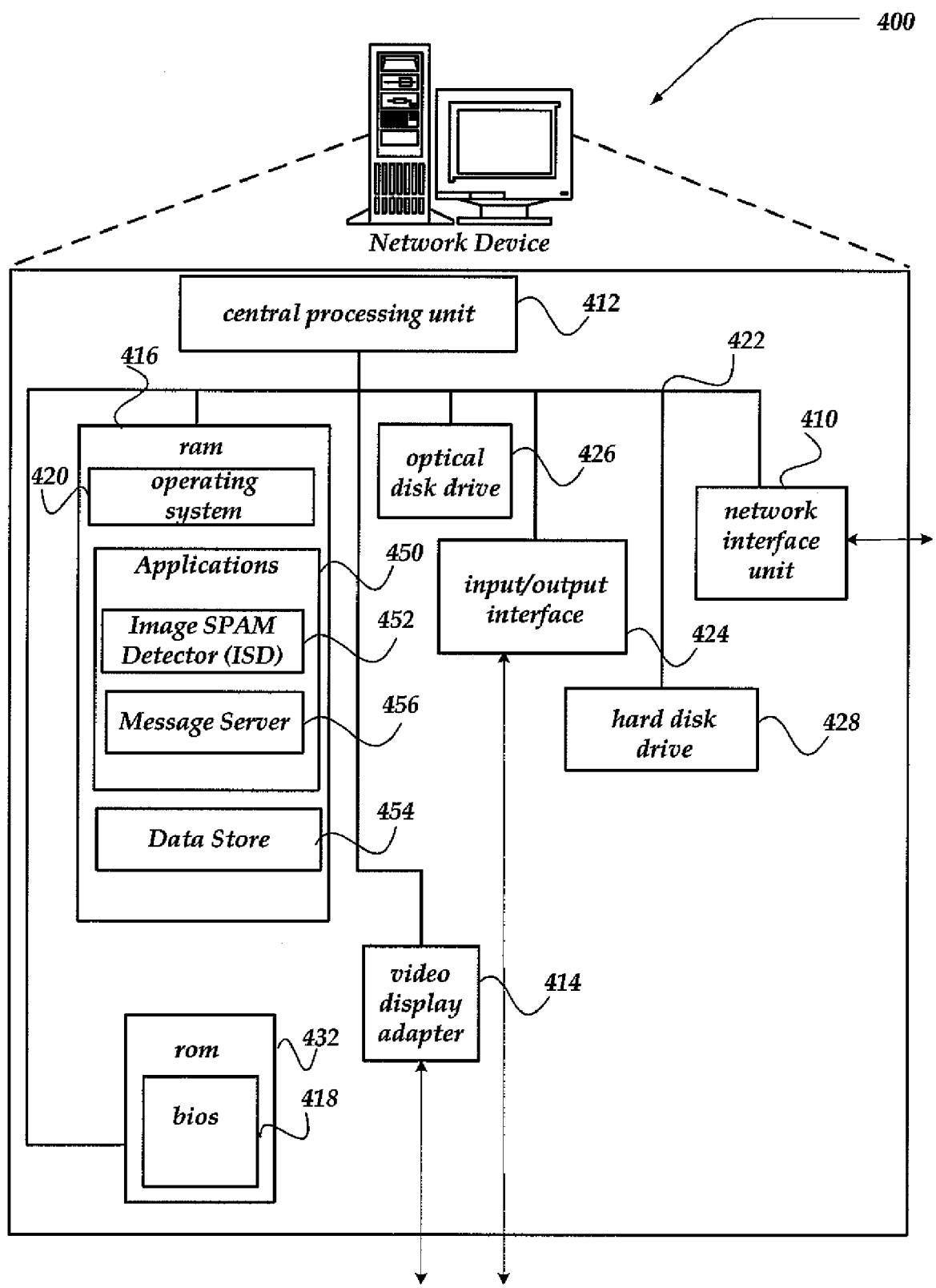
FIG. 4 shows one embodiment of a network device that may be employed to provide image spam detection.

FIG. 4 shows one embodiment of a network device, according to one embodiment of the invention. Network device 400 may include many more or less components than those shown. The components shown, however, are sufficient to disclose an illustrative embodiment for practicing the invention. Network device 400 may, for example, represent SDS 206 of FIG. 2.

Network device 400 includes processing unit 412, video display adapter 414, and a mass memory, all in communication with each other via bus 422. The memory generally includes RAM 416, and ROM 432. Network device 400 also includes one or more mass storage devices, such as hard disk drive 428, tape drive, optical disk drive, and/or floppy disk drive. The memory stores operating system 420 for controlling the operation of network device 400. Any general-purpose operating system may be employed. Basic input/output system ("BIOS") 418 is also provided for controlling the low-level operation of network device 400. As illustrated in FIG. 4, network device 400 also can communicate with the Internet, or some other communications network, via network interface unit 410, which is constructed for use with various communication protocols including the TCP/IP protocol. Network interface unit 410 is sometimes known as a transceiver, transceiving device, network interface card (NIC), or the like.

Network device 400 may also include an SMTP handler application for transmitting and receiving email. Network device 400 may also include an HTTP handler application for receiving and handing HTTP requests, and an HTTPS handler application for handling secure connections. The HTTPS handler application may initiate communication with an external application in a secure fashion.

Network device 400 also may include input/output interface 424 for communicating with external devices, such as a mouse, keyboard, scanner, or other input devices not shown in FIG. 4. Likewise, network device 400 may further include additional mass storage facilities such as optical disk drive 426 and hard disk drive 428. Hard disk drive 428 is utilized by network device 400 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 450 are loaded into memory and run on operating system 420. Examples of application programs include schedulers, calendars, transcoders, database programs, word processing programs, spreadsheet programs, security programs, web servers, and so forth. Mass storage may further include applications such message server 456, Image Spam Detector (ISD) 452, and data store 454.

Data store 454 is configured and arranged to store and otherwise manage messages, statistical data, images including training images, generated signature vectors, generated weighting vectors, or the like. Data store 454, however, is not limited to managing storage of these example items, and other items, data, information, or the like, may also be stored within data store 454, without departing from the scope of the invention. For example, data store 454 may also include user account information, policies, procedures or the like, useable for inhibiting delivery of image spam. Data store 454 may be implemented using a variety of technologies, including, but not limited to, folders, spreadsheets, data bases, scripts, applications, or the like.

Message server 454 may include virtually any computing component or components configured and arranged to forward messages from message user agents, and/or other message servers, or to deliver messages to a local message store, such as data store 454, or the like. Thus, message server 454 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 454 is not constrained to email messages, and other messaging protocols may also be managed by one or more components of message server 454. Thus, message server 454 may also be configured to manage SMS messages, IM, MMS, IRC, mIRC, or any of a variety of other message types. Moreover, message server 454 may further manage messages that may include one or more image files, links to image files, or the like.

ISD 456 is configured and arranged to operate in conjunction with message server 454 to detect and inhibit delivery of a message that is determined to include image spam. Thus, ISD 456 may either intercept a message to be delivered by message server 454, or receive a message from message server 454 for inspection. ISD 456 may then determine whether the message includes an image file. As described herein, ISD 456 may generate a signature vector from the received image based on feature frequency and intensity bits of the image. ISD 456 may then employ a weighting vector that is generated based on applying a machine learning algorithm to signature vectors from known image spam and/or known non-spam images (ham images). ISD 456 may employ the weighting vector to weight a min-hash near duplicate detection that is then used to determine whether the received image is likely to be spam. ISD 456 may employ processes as described below in conjunction with FIGS. 5-9 to perform at least some of its actions. If ISD 456 determines that the received image is likely to be spam, one or a variety of actions may be taken, including, but not limited to purging the message of the image, and allowing the purged message to be forwarded; deleting the message; rejecting the message, and sending a notice to a message sender, and/or an intended message recipient; or any of a variety of other actions.

Generalized Operation

Figure 5:
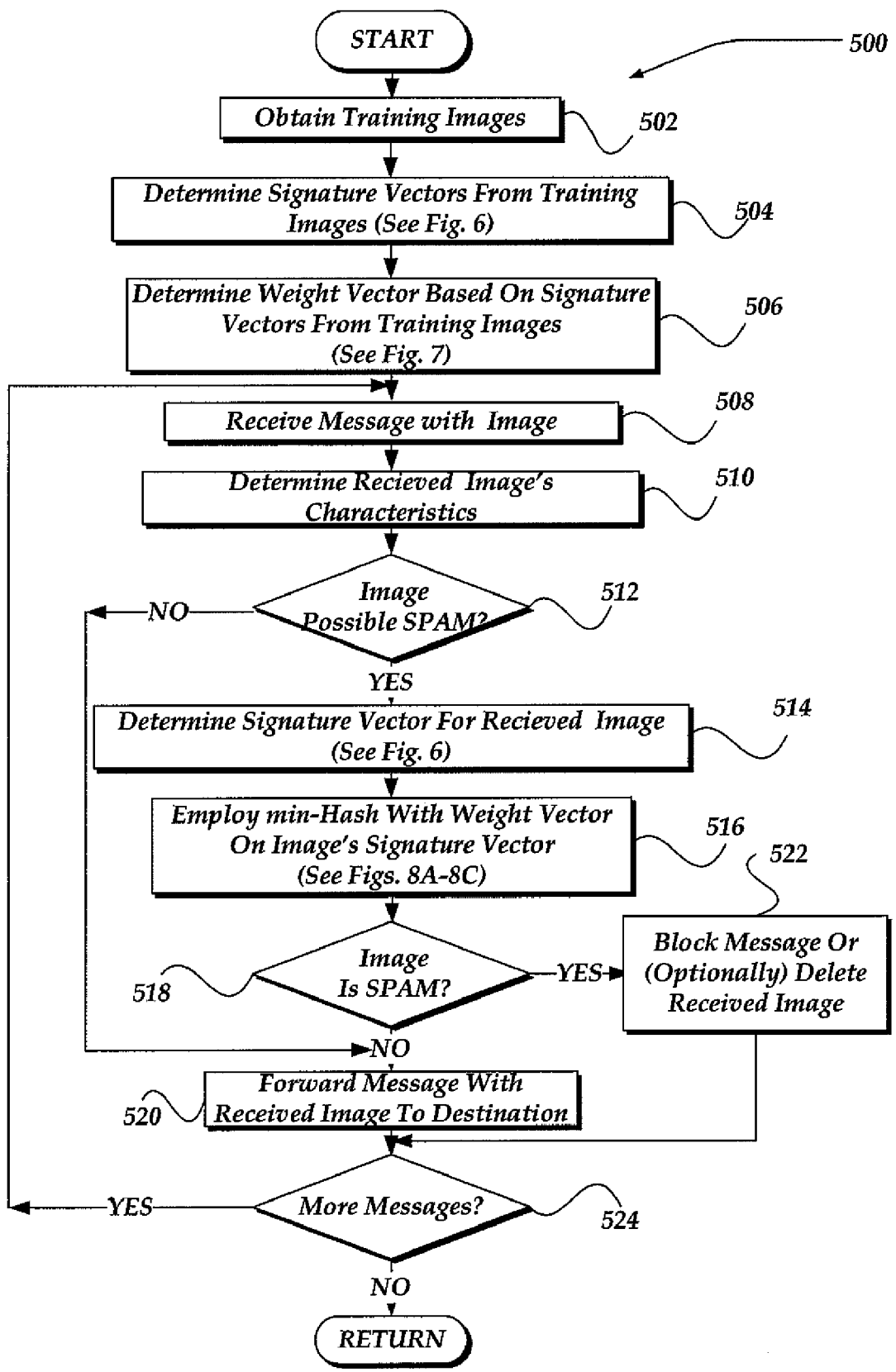
FIG. 5 illustrates a flow diagram generally showing one embodiment of an overview of a process for generally detecting image spam within a message using a weighted min-hash to perform near duplicate detection of images.

The operation of certain aspects of the present invention will now be described with respect to FIGS. 5-11. FIG. 5 illustrates a flow diagram generally showing one embodiment of an overview of process 500 generally useable in statistically detecting image spam within a message. Process 500 may be implemented within SDS 206 of FIG. 2, for example.

Process 500 is directed towards analyzing differences in message distribution patterns including text and non-test within images using a weighting vector generated using a machine learning algorithm to identify an importance or weight for each bit from signature vectors of training images. A weighted min-hash is then employed to determine whether the current image includes a spam message (text or non-text). As noted above, however, the invention is not constrained to examining merely text within the image, and other features may also be examined, including, but not limited to intensity, size of data of an image, or the like.

In any event, process 500 begins, after a start block, at block 502, where training images are obtained. Training images are images that are known to include text spam or image spam. Moreover, training images may be composed of positive images, those that are known to include spam, and negative images, those that are known to be ham, or do not include spam. Such training spam images may include, for example, the image spam 102-103 of FIG. 1. In a typical training scenario, the training images may be grouped into one or more groups based on a variety of characteristics, such as having similar text, similar meaning of text, similar background clutter, or the like. In one embodiment, the training spam images may be grouped using a normalized-cut algorithm based on information obtained from a discrete cosine transform (DCT) that may identify the grouped images to have a common feature. Other grouping techniques, characteristics, and/or algorithms may also be used to group training images into one or more groups. The groupings may be directed, in one embodiment, to minimize variations in generated signature vectors for images within a group that might arise due to polygon noise, or the like.

Process 500 flows next to block 504, which is described in more detail below in conjunction with FIG. 6. Briefly, however, at block 504, signature vectors are determined for each training image by, in one embodiment, bounding, resizing, and/or converting color images to grayscale. The converted image may then be converted to a frequency domain using DCT, filtered using a high-pass filter, "thresholding" the result, and then using a quantization of the result to obtain the output signature vector for each image. However, any form of feature can be used in the signature vector, if, for example, the feature can be converted into a set of binary features. For example, an intensity of an image may be used to generate a bit feature as disclosed in FIG. 10.

The resulting output signature vectors for the training images may then be provided to block 506, where a weighting vector (magic vector) may then be determined. Block 506 is described in more detail below in conjunction with FIG. 7. Briefly, however, the magic vector or weighting vector, in one embodiment, is determined using a machine learning algorithm, such as a perceptron. However, the invention is not limited to such algorithm, and others may also be used. In any event, processing then flows to block 508, where the resulting magic vector or weighting vector may be used to determine whether an image within a received message is image spam. The weighting vector is generated automatically using the machine learning algorithm to determine which bits within a signature vector may have more importance than other bits. Such action is directed towards decreasing a likelihood of false negative/positive image detections.

It should be noted that the weighting vector may also be revised based on a variety of criteria, including, but not limited to an error rate in detecting image spam, new known text image spam available, or the like. Thus, blocks 502-506 may be performed virtually anytime to revise and update the resulting magic vector or weighting vector.

In any event, processing may then flow to block 508 where a message is received that include an image file. Moving next to block 510, the image file is extracted to determine if the image file should be examined further. In one embodiment, various characteristics of the received image file may be determined and used to make such a determination, including, but not limited to the file type, file size, compression ratio, dimension (e.g., pixel size), or the like. In one embodiment, statistical analysis may appear to indicate, at least initially, that GIF type files tend to be employed for image spam over other types of files, including for example, PNG file types, PDF files types, JPEG file types, or the like.

In one embodiment, the received image's file size may be useable in initially determining whether an image file may be image spam. For example, statistical analysis may appear to initially indicate that image spam file sizes tend to fall into a range of file sizes between about 4 kb to about 40 kb, or so. Similarly, statistical analysis of known image spam appears to indicate currently that image spam file dimensions tend to appear within definable dimensional ranges, such as 200×200 pixel sizes, 300×800 pixel sizes, or the like. For example, in one embodiment, images with dimensions of 300×150, 860× 260, or the like, may be determined to be candidates as possible image spam, without departing from the scope of the invention.

Thus, a possible image spam file may be selected for further analysis based on one or more of these characteristics. However, it is also known that such values, file types, or the like, may change over time. Thus, as part of process 500, additional analysis may be performed to adjust the values, file types, characteristics, or the like, that may be employed to initially select an image for additional analysis. For example, where analysis indicates that JPEG file types, or MMS file types, or the like, or being employed to communicate image spam, criteria used at block 510 and decision block 512 may be adjusted. For example, where it is determined that a spammer has changed its strategy of using GIF files under a certain size and JPEG for files over another size, the invention can readily be modified to account for, and monitor for such changes in image spam patterns. Moreover, user feedback may be used to identify where the initial determination at blocks 510/512 is allowing an unacceptable amount of image spam through. Such feedback may then be used to assist in tuning the initial analysis steps. Moreover, periodic analysis may also be performed to determine whether a shift in image spam patterns is occurring.

For example, in one embodiment, user feedback may be used to identify that some image files are being identified improperly as image spam, or improperly as non-image spam. Based, in part, on trusted user feedback, a digital electronic signature based exemption may be applied such that the improperly identified image will be properly allowed when it is next received within a message. For example, in one embodiment, a CRC8 32-bit digital electronic signature, or the like, may be determined for identified image files. Then, when the file is seen again, an appropriate action may be taken based on the digital electronic signature.

Similarly, where the dimensions, file sizes, or the like, appear to become different than initially determined, the invention may readily adjust for such changes. Moreover, any of a variety of other characteristics may also be employed to monitor and/or initially select images for additional analysis. Moreover, it should be noted, that blocks 510 and 512 are directed to accelerating the process by reducing a number of images to be examined. The invention, however, is not constrained from examining each received image file, and thus, bypassing blocks 510 and 512 may be selected, without departing from the scope of the invention.

However, as illustrated, process 500 moves to decision block 512, where an initial determination may be made based on various characteristics as described above. If, based on the initial determination, the received image is to be examined further, processing flows to block 514; otherwise, processing branches to block 520, where the message may be forwarded to its intended destination.

Block 514 is described in more detail below in conjunction with FIG. 6. Briefly, however, a signature vector is determined for the received image file. As noted above, at block 514, in one embodiment, the image may be bound, resized, and/or converted to grayscale. The converted image may then be converted to a frequency domain using DCT, filtered using a high-pass filter, the result may then be "thresholded," and then using a quantization of the result the output signature vector for image may be obtained. In one embodiment, the signature vector comprises feature bits selected from a low frequency and intensity bits of the received image. In one embodiment, the signature vector is 125 bits in length; however, the invention is not limited to this length, and other lengths may also be selected.

Process 500 moves next to block 516 where a trained importance of each bit within the weighting vector is used to lookup within a min-hash table to determine whether the received image includes text spam. One embodiment, of a process useable at block 516 is described in more detail below in conjunction with FIGS. 8A-8C.

Proceeding next to decision block 518, where a determination is made based on the results of block 516, whether the received image includes text spam. If the received image is determined to be text spam, processing proceeds to block 522; otherwise, processing moves to block 520.

At block 520, the image is determined to not to include text spam. Thus, the message, including the image may be forwarded to its destination. Processing then returns to a calling process to perform other actions.

At block 522, however, the image is determined to be image spam. As such, any of a variety of preventative actions may be performed, including, but not limited to deleting the message, such that it may not be sent to its destination, expunging the message of the determined image spam but allowing the message to be forwarded, or the like. In addition, an alert, or the like, may also be sent to an administrator, destination, law enforcement agency, or the like. In any event, processing then returns to a calling process to perform other actions.

Figure 6:
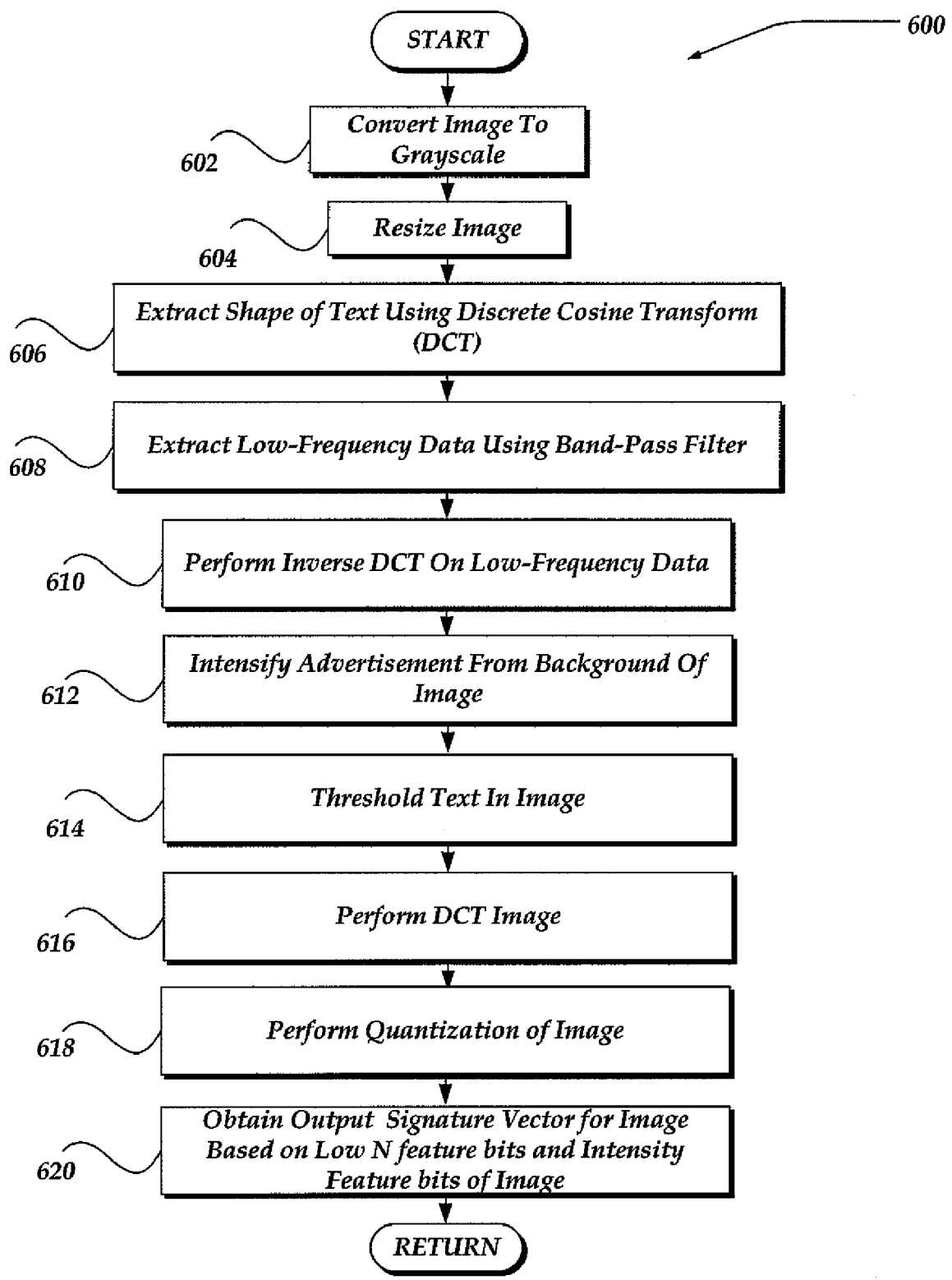
FIG. 6 illustrates a flow diagram generally showing one embodiment of an overview of a process for extracting feature bits from an image to generate a signature vector.

FIG. 6 illustrates a flow diagram generally showing one embodiment of an overview of process 600 generally useable to obtain a signature vector for an image. In one embodiment, the signature vector for an image may be obtained using a modified discrete cosine transform to generate coefficients in a low frequency domain. The signature vector is then generated by extracting selected feature bits from the low frequency and intensity feature of the image. Process 600 may be used to provide signature vectors for the training images, as well as for the received image to be evaluated.

Process 600 begins, after a start block, at block 602, where the image may be converted to grayscale. Use of grayscale is directed towards minimizing variations in a resulting signature vector that might arise due to color variations within the text and/or surrounding image.

In one embodiment, converting of the image to grayscale may be performed by selecting a luminance component of a color model for which luminance and/or chrominance information may be uncorrelated, while ignoring chrominance components. One embodiment of an example how this might be performed is using a macro to do the conversion. For example, in one embodiment, the following definition might be used:

define  PixelIntensityToQuantum(pixel)((double) (V1*pixel[red]+V2*pixel[green]+V3*pixel[blue]+F)), where V1, V2, V3, and F are selectable values.

In one embodiment, V1 may be selected to between about 0.2 to about 0.32, V2 may be selected between about 0.5 to about 0.64, V3 may be selected to be between about 0.9 and about 0.14, where V1+V2+V3 is one, and F=0.5. However, it should be clear that the invention is not constrained to these values, and others may be used, without departing from the scope of the invention. Moreover, in one embodiment, various implementations might employ a tool such as by ImageMagick Studio LLC. However, other tools may also be employed, including, for example, GD Graphics Library, an Open Source code library, or the like.

Processing moves next to block 604, wherein the image may be resized. Resizing of the image is directed towards again minimizing variations that may arise due to size differences. While smaller image sizes may provide processing efficiencies, the invention is not limited to a particular image size. Thus, virtually any size may be selected upon which to base a comparison, including, but not limited to 128×128, 256×256, 120×120, or the like. Moreover, it should be noted, that the image may be converted to grayscale before or after the image is resized. Thus, blocks 602 and 604 may be interchanged without departing from the scope of the invention.

In any event, processing flows next to block 606, where the image may be submitted to a discrete cosine transform (DCT) directed towards extracting a shape of an image, such as an advertisement, or the like, whether it be text or non-text. Processing continues to block 608, where the DCT output is passed through a low pass filter directed towards removing high frequency noise that might arise due to background graphics, or the like, and to further highlight shapes of the text within the image. Moreover, the output may be passed through a low pass filter directed towards removing low frequency noise that might arise due to intentional noise, or the like, such as a polygon might create that may be inserted by a spammer.

Processing continues next to block 610, wherein the results of the filtering is provided to an inverse DCT to emphasize further the shape of any advertisement or the like within the image and to further reduce any noise due to the background, a presence of polygons within the image, or the like.

Process 600 continues to block 612, where an analysis is performed to determine whether text within the image may be darker than the background. If so, then the sign of the intensity in the image may be changed. This action is directed towards further highlighting the text and removing noise that polygons, or the like, within a background may generate. In one embodiment, block 612 may be performed prior to block 610.

Processing then flows to block 614, where thresholding may be performed to eliminate weak edges of the text. While this may be achieved using any of a variety of mechanisms to distinguishing edges, one embodiment, employs a thresholding value for each pixel of between about 0.8 to about 0.95%, or so. If a chrominance associated with a given pixel is below the threshold value, the pixel is converted to a block pixel, thereby, strengthening edges within the image. Strengthening edges within an image, however, is not limited to this approach, and clearly other mechanisms may also be used to strengthen the image. Moreover, pixels falling below the threshold may also be converted to white, without departing from the scope of the invention. However, virtually any mechanism may be used to convert a contrast of a pixel within a determined weak edge to a higher contrast may be used to strengthen the edge of text.

Processing continues next to block 616 where the results may then be converted back to the frequency domain by applying another DCT Processing flows to block 618, where quantization may be applied to the frequency domain results. Virtually any quantization mechanism may be used, however, in one embodiment, quantization may be employed to compress the information in the frequency domain results by assigning a 1 bit when a value is greater than a d.c. or average value, and assigning a zero bit value otherwise.

For example, in one embodiment, a quantization sub-process may be performed that iterates for n times, where n may be virtually any value. Typically, n may be between 3 and 12. At an i-th iteration, the sub-process quantizes a value between $(i-1)*i/2+1^{st}$ value to $i*(i+1)/2^{nd}$ value. A median value may then be determined from the $1^{st}$ value to the $i*(i+1)/2^{nd}$ value. If the values are less than the determined median value, then the value may be set to zero; otherwise, the value may be set to one.

Processing continues next to block 620 where the signature vector for the image is obtained by employing a selected number of feature bits from the lowest frequency of the results of block 618, and another selected number of bits from an intensity feature of the image. Virtually any number of bits may be used. For example, selecting more bits is directed towards increasing signature comparison accuracy, but may increase a cost of computation. Thus, in one embodiment, the low frequency bits may be selected between 64-256 bits. For the examples, that follow, the number of bits may be selected as 119 bits. However, as noted, the invention is not so limited, and any of a variety of other bits may be selected. Similarly, the intensity bit count may be any number of bits; however, in one embodiment, the selected intensity bits may be between 4-8 bits. For example, in one embodiment, the selected bits for intensity may be 6 bits. Such selections may then result in a signature vector having 125 bits to represent the text image. Process 600 then returns to a calling process to perform other actions.

Figure 7:
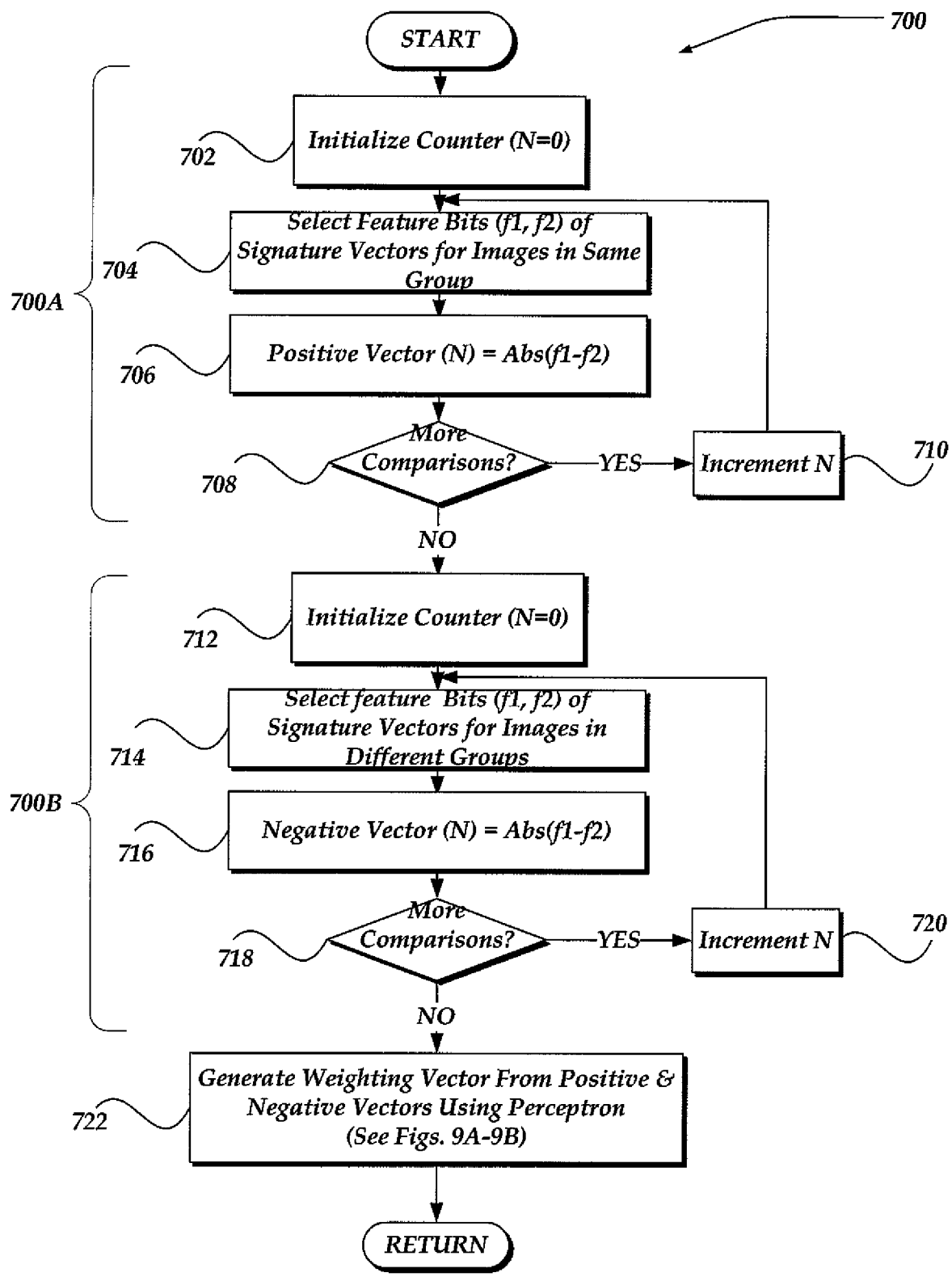
FIG. 7 illustrates a flow diagram generally showing one embodiment of an overview of a process for training a weighting vector.

FIG. 7 illustrates a flow diagram generally showing one embodiment of an overview of process 700 generally useable to generate or train a weighting vector (sometimes called a magic vector) useable to weight signature vectors during comparisons against known text image spam files. Use of the weighting vector, is directed towards improving efficiency by directing resources towards the analysis of selected bits within a signature that are determined to more likely distinguish spam images from ham images. Such weighted results may then be compared using a min-hashing technique in the process described below in conjunction with FIGS. 8A-8C.

Briefly, process 700 determines two feature vectors for each group from the training images described above: a positive vector, and a negative vector. The positive vector is arranged to provide a weighting value indicating how much feature bits are common or share a common similarity within a group of images. The negative vector is arranged to provide a weighing value indicating how much feature bits within images within one group are different from the same feature bits within images in another group. Such information (positive and negative vectors) may then be submitted to a machine learning algorithm such as a perceptron, or the like, to identify an importance or weight for each feature bit. The result is a single weighting vector or magic vector that is directed towards being independent of any single group.

Thus, process 700 begins, after a start block, at block 702, wherein a counter representing the number of positive comparisons to make for a group, is initialized. In one embodiment, the counter may be set to zero. For sake of illustration, assume that there are two groups, with group I having three images (A, C, and C), and group II having two images (E and F). Clearly, there may be many more groups, with each group having many more images than the example. However, such numbers are intended merely to make the example easier to understand, and is not intended in any way to limit or otherwise narrow the scope of the invention. In any event, in this example, there would be 3 positive vector comparisons for group I and 1 positive vector comparison for group II. Similarly, there would be 5 negative vector comparisons for groups I and II.

Figure 10:
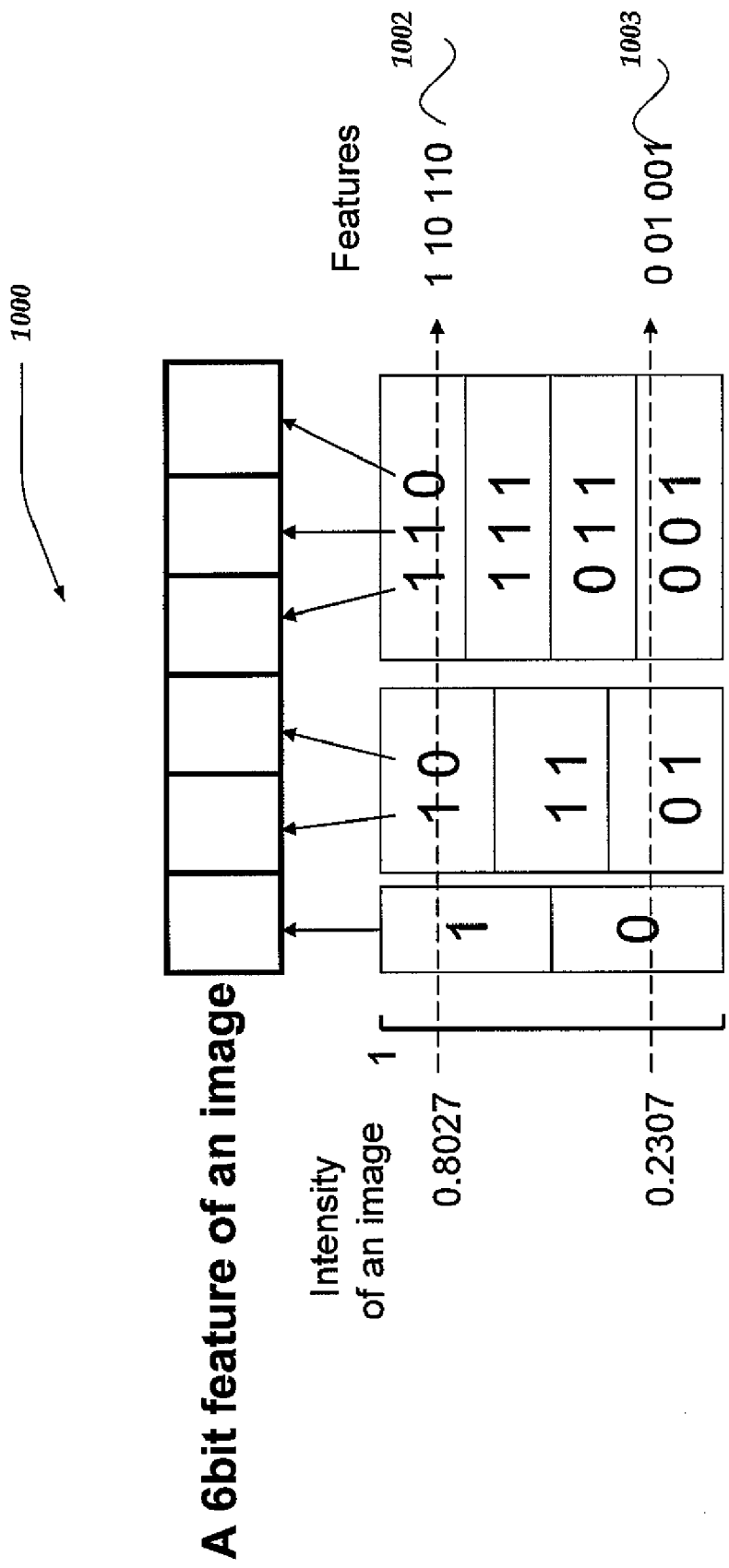
FIG. 10 illustrates one example of extracting feature bits from an intensity of an image.

Proceeding to block 704, each signature vector for a given image within a same group are selected, and at block 706, an absolute value of a difference of each bit within the signature vectors are used to set bit values within a corresponding positive vector. For example, referring briefly to FIG. 10, shown are two feature values for intensity bits (features 1002 and 1003) for two different images within a same group. The absolute value of the differences between features 1002 and 1003 is the value "111111" indicating that each bit within the intensity bits are different. This would then represent the positive vector value for this comparison.

Returning to process 700 of FIG. 7, processing continues to decision block 708, where a determination is made whether there are more positive comparisons, if so, processing flows to block 710, where the counter is incremented, and the process loops back to block 704, until no more positive comparisons are to be performed for the group. In one embodiment, sub-process 700A (comprising blocks 702, 704, 706, 708, and 710) may be performed first for each group, followed by sub-process 700B.

In any event, processing may next flow to block 712 to determine the negative vector for the groups. As shown, a counter representing the number of negative comparisons to be performed is again initialized. Processing ten flows to block 714, where features, such as the intensity feature bits may be selected for comparison between images within different groups.

Processing continues next to block 716, where the negative vector value for the current comparison is determined based on an absolute value of the differences between the feature bit values. Processing continues to decision block 718, where a determination is made whether there are more comparisons. If so, processing flows to block 720, where the counter is incremented, and the process loops back to block 714; otherwise, processing flows to block 722.

Block 722 is described in more detail below in conjunction with FIGS. 9A-9B. Briefly, however, at block 722, a machine learning algorithm is employed to find a single weighting vector using the resulting positive and negative vectors determined above. In one embodiment, the machine learning algorithm is a perceptron algorithm. Basically, a perceptron algorithm operates as a type of binary classifier that is configured and arranged to map its input, the positive and negative vectors) to an output using a learning mechanism. The resulting output is a weighting vector that provides a weighting to be applied to particular bits within an image's signature vector when performing comparisons. The weighting vector is directed towards automatically determining which of the feature bits may have more importance in detecting image spam over other bits. By varying the weighting applied to the bits, it is expected that improved detection accuracy may be achieved while reducing false positive/negative detections over more traditional approaches that assume a constant bit weight.

Figure 11:
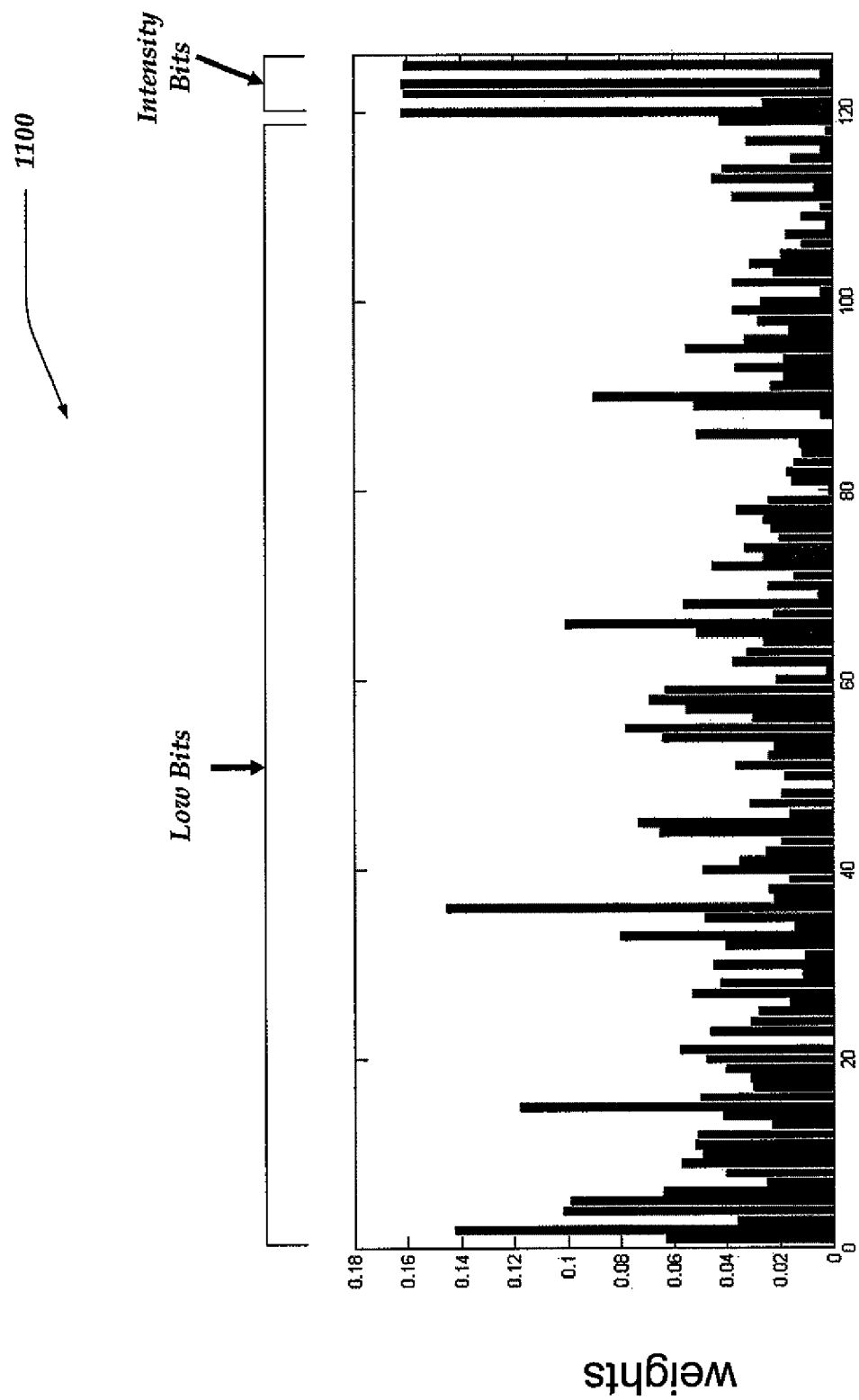
FIG. 11 shows one possible embodiment of an example weighting vector generated using a perceptron as described herein.

Briefly referring to FIG. 11 is one embodiment illustrating various weights for bits within weighting vector 1100. Each bit within a signature vector may have a weight varying from zero to 1, as determined by the machine learning mechanism. In any event, process 700 may then return to a calling process to perform other actions.

Figure 8A:
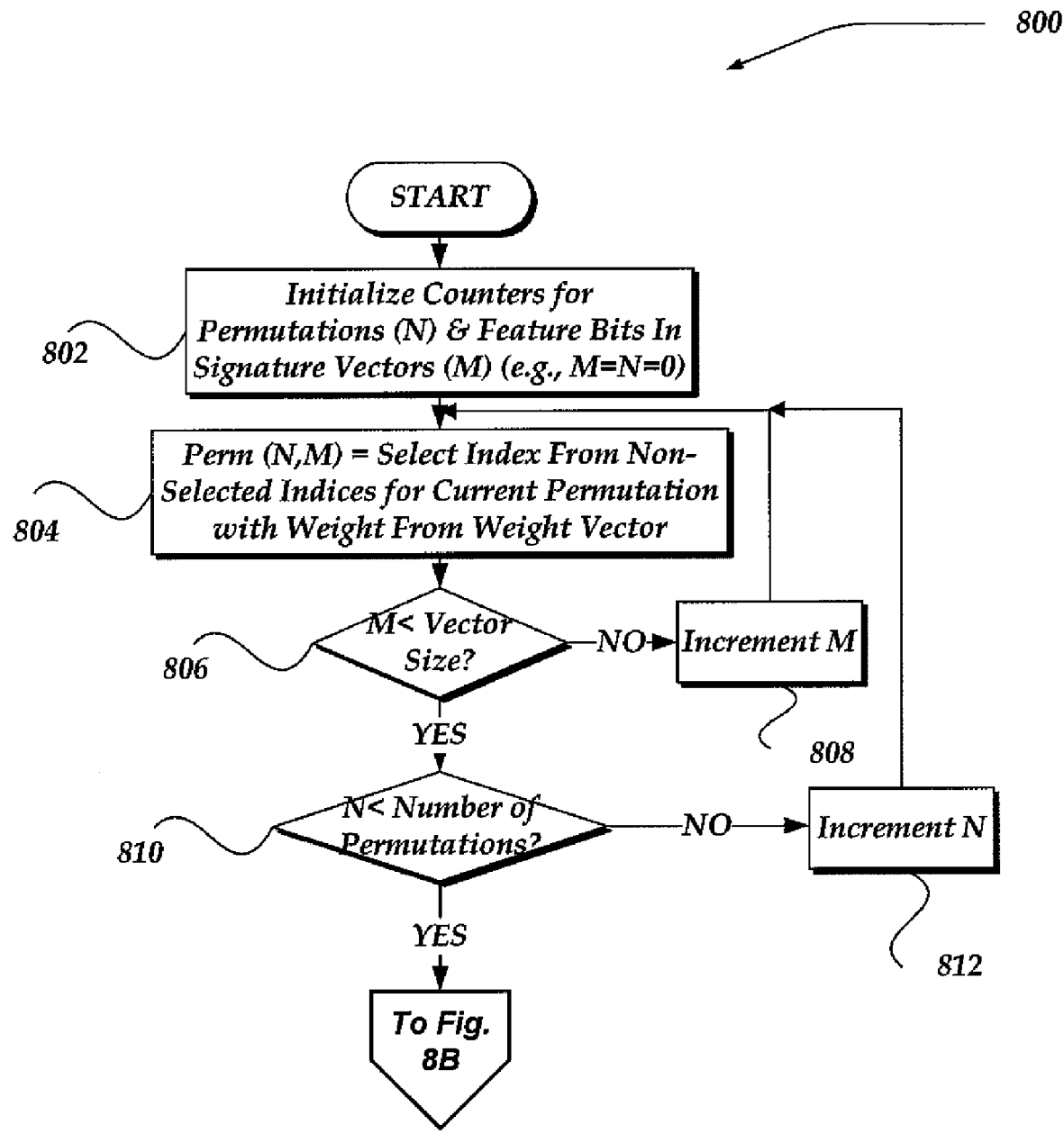
FIGS. 8A-8C illustrate a flow diagram generally showing one embodiment of an overview of a process for employing a weighted min-hash algorithm to perform NDD on a received image's signature vector to detect spam images.
Figure 8B:
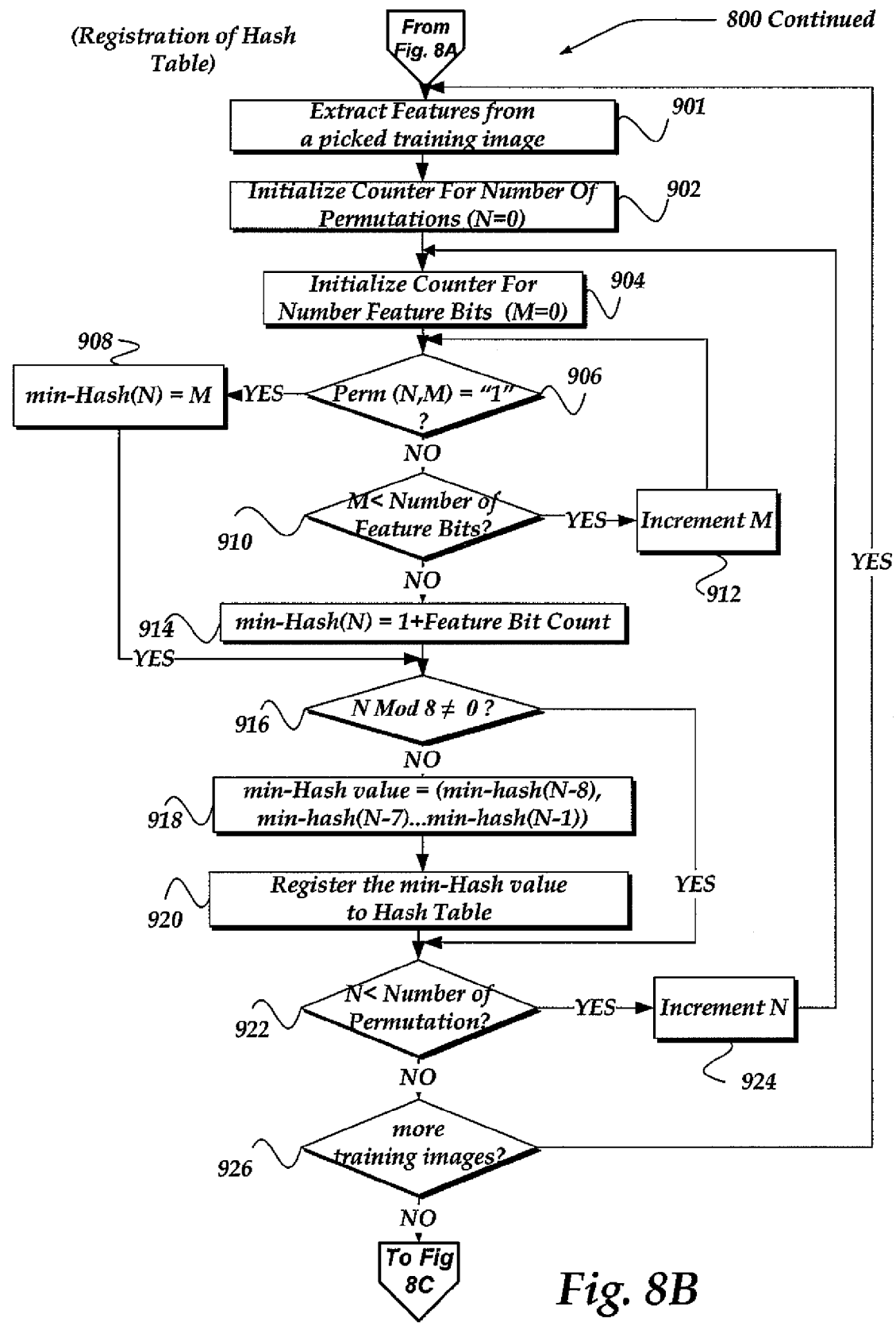
Figure 8C:
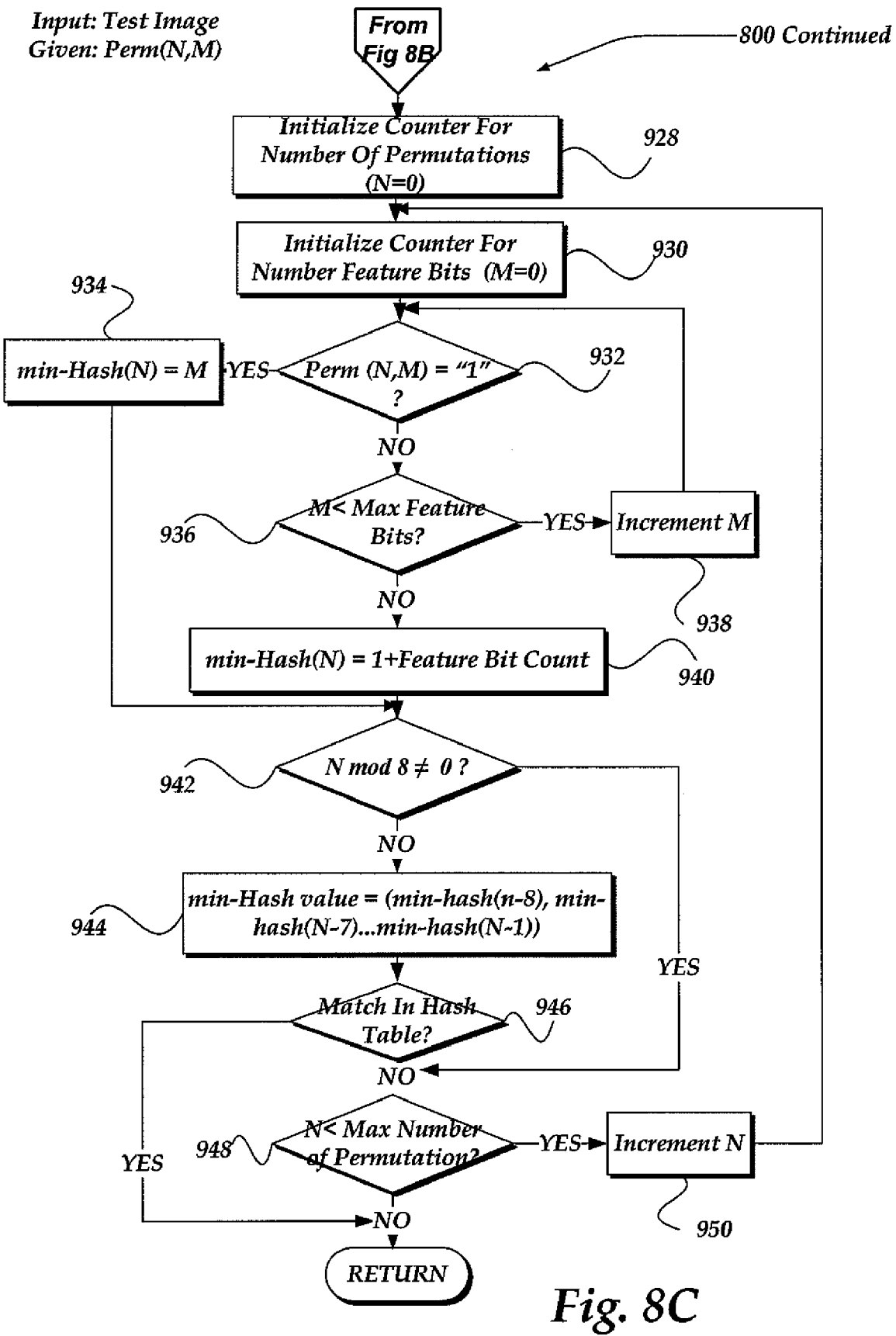

FIGS. 8A-8C illustrate a flow diagram generally showing one embodiment of an overview of process 800 generally useable to perform a weighted comparison of image signature vectors to determine whether a near-duplicate match is exists using a min-hash algorithm. Briefly, a min-hash represents a single number having a property that two sets A1 and A2 have the same value of min-hash with probability equal to their similarity sim(A1, A2), where:

$$\text{Sim}(A1, A2) = \text{Abs}(A1 \cap A2) / \text{Abs}(A1 \cup A2),$$

where A1 and A2 are image signature vectors.

Two images may then be said to be near duplicates if the similarity sim(A1, A2) is greater than some given threshold value. One example of use of a similarity min-hash comparison for near duplicate document comparisons is described in more detail an article entitled "Scalable Near Identical Image and Shot Detection," by Ondrej Chum et al, published Sep. 7, 2007 and available through Association for Computing Machinery (ACM), and which is incorporated herein by reference. It should be noted, however that the invention is not limited to merely using such min-hash, and other near duplicate comparison mechanisms may also be used, including but not limited to locality sensitive hashing techniques, fuzzy hashing, or the like.

As described below, the process may be seen as generating random permutations, followed by generating and registering a hash table, and then applying the permutations to the received image to determine if there is a near duplicate detection.

Thus, process 800 begins, after a start block, at block 802 with pre-processing actions. That is, counters are initialized (e.g., set to zero) for a number of permutations, N, and a length of a feature vector, M. In one embodiment, the length of the feature vector is the length of the signature vectors. In one embodiment, such length, M, equals 125. The number of permutations may be virtually any value. More permutations may provide a more accurate matching result. However, more permutations may also require more computations. Thus, in one embodiment, and for sake of illustration only, N may be set to between 32 and 256. In one embodiment, a typical value might be for N=64, while a length of a typical hash value may be around 8. That is, if N=64, then there may be (64/8) or 8 hash values. For each training image, reference image, the 8 values may be registered in 8 hash tables.

Processing continues to block 804 where a permutation is set based on selecting an index from non-selected indices for a current permutation with a weight selected from the weighting vector. That is, a random permutation may be generated from a set of numbers, similar to a random selection except (e.g., the weights of numbers in the selection). As seen a number may be selected from an unselected number (initially all values) with a probability of weighted by the weighting vector. The probability of a selection of a number (i) with a weight w(i) is w(i) over the sum of all weights in the weighting vector. That is, a larger weighting, it has a higher probability of being selected.

Process 800 moves next to decision block 806, where a determination is made whether M is less than the vector size.

In this instance, the vector size is selected as 125; however, as mentioned elsewhere, it may be virtually any value. In any event, if M is less than the vector size, processing flows to decision block 810; otherwise, processing flows to block 808.

At block 808, M is incremented, and processing loops back to block 804 to select another index from the non-selected indices. At decision block 810, N is evaluated to determine if it is less than the number of permutations, if not, processing branches to block 812, where N is incremented, and processing loops back to block 804. Otherwise, processing continues to block 901, where registration of the hash table is commenced.

In way of a brief explanation of process 800 so far, consider a sequence of numbers from 1 to 15, rather than 1 to 125 as would be the instance for a vector size of 125. Each number 1-15 would indicate each of the features extracted from an image.

One can then generate random permutations from the numbers such as the following, non-exhaustive examples:
Example 1: 4, 2, 5, 3, 12, 14, 8, 10, 9, 11, 1, 7, 6, 13, 15
Example 2: 7, 10, 3, 15, 6, 11, 1, 12, 8, 12, 5, 14, 4, 2, 9
Example 3: 6, 15, 14, 1, 13, 8, 7, 12, 11, 10, 9, 5, 2, 4, 3

Note that these may represent random permutations of the numbers 1-15. Now, assume that each feature has a different importance or relevancy in detecting spam images (different weights). Let's assume for illustration, that feature bit 10 is determined from the machine learning algorithm to have more importance than feature bit 1 (for example, 3 times). Moreover, feature 1 is more important than feature 2 at twice as much. Then as shown, the weighting vector might be:
Numbers: 1, 2, 3, 4, 5, 6, 7, 8, 9, 10, 11, 12, 13, 14, 15
Weights: 2, 1, 1, 2, 3, 3, 2, 8, 1, 6, 5, 3, 2, 3, 7

In this simplified non-exhaustive example, then it might have been determined that features 8, 10, and 15 have the most important features within the signature vectors. Thus, it is desirable that these features appear as early as possible within the permutations. This may be achieved by using the weighting as a probability of their selections at block 804.

For a uniform random weighting, however, the probability of selection in the example, is 1/15 or 6.67%. However, with the example weighting vector above, feature bits 8, 10, and 15 have higher probabilities of being selected of:
Probability of selecting 8 is 8/49 or 16.33%,
Probability of selecting 10 is 6/49 or 12.24%, and
Probability of selecting 15 is 7/49 or 14.00%.

Thus, the permutations might look like the following:
Example 1: 8, 15, 11, 12, . . .
Example 2: 15, 11, 5, 8, . . .
Example 3: 11, 8, 14, 15, . . .
with features 8, 15, 11, in front of the other features in the permutations.

In any event, process 800 continues to block 901, where features are extracted from the selected training images. Processing continues to block 902, where the number of permutations, N, is initialized. Processing flows next to block 904, where the counter for the number of feature bits, M is also initialized. Processing then flows to decision block 906 where a determination is made whether the value M-th number in the N-th permutation has a value of 1. If not, then processing flows to decision block 910, where a determination is made whether M is less than the number of feature bits. If so, processing flows to block 912, where M is incremented, and the process loops back to decision block 906; otherwise, processing flows to block 914.

If so, processing flows to block 908; otherwise, the processing continues to decision block 910. At block 908, the value for the min-hash registration for the N-th number is set to the value of the M. That is, suppose the number M is 55 (out of a maximum of 125 in one embodiment). Then if the $55^{th}$ feature of the training image is '1', the resulting value of the min-hash(N)=55, which means that the first non-zero feature in the N-th permutation is 55. As is seen, this process may iterate over a maximum number of permutations or feature bits (e.g., 125). Processing, then flows from block 908 to decision block 916.

At block 914, however, the value for min-hash(N) is set to the feature bit count plus 1, which indicates that if there are non non-zero features in the images (from 1 to 125); the min-hash(N) has a maximum +1 value (e.g., 125+1).

Processing continues next to decision block 916, where a determination is made whether N mod(8) is not equal to zero. This test means that the accumulated values from the permutations are grouped by 8 (other groupings may also be selected, without departing from the scope of the invention). Suppose, for example, that the results of the hash code from permutations from the $1^{st}$ to the $8^{th}$ permutation are as follows: 55, 25, 23, 99, 32, 22, 34, 24. Then, the 8 pairs may be a hash value for a database which includes all the hash values from the training known spam images. If the received, test image, has a similar feature with the known spam images, as tested at decision block 946 below, the result would be similar or the same results as the known spam image. However, if the results (hash code) from a training known spam image instead is: 55, 25, 23, "54", 32, 33, 34, 24, then the $4^{th}$ result is different than the image under test. Thus, the process generates multiple hash codes to increase a probability of matching, which makes the overall process more robust to image noise over traditional approaches.

In any event, if at decision block 916, the result is true, then processing loops to decision block 922; otherwise, processing flows to block 918, where the min-hash value is set to (min-hash(N−8), min-hash(N−7) . . . min-hash(N−1)). That is, the hash code is generated for 8 permutations. Again, while the value 8 may be selected as any value, increasing the value may reduce robustness against noise for the process. If the hash codes are generated with smaller permutations, such as 3 permutations, then more hash codes might be generated, such as 21, or so.

Continuing, process 800 flows next to decision block 922, where a determination is made whether N is less than the number of permutations. If so, processing flows to block 924, where N is incremented, and the process loops back to block 904. Otherwise, processing flows to decision block 926, to determine whether there are more training images to consider in the registration of the hash table. If not, then processing continues to block 928 (illustrated starting on FIG. 8C); otherwise, if so, then processing loops back to block 901, where features are extracted from another training image.

It is noted, that if the registered hash table from the training images are available, at this point, then testing may occur here. The following portion of process 800 is directed towards employing the weighted min-hash table generated and registered (e.g., stored in a data store for subsequent use) to perform a comparison to detect a near duplicate match. Thus, processing proceeds at block 928, to perform actions similar to above. That is, at blocks 928 and 930 counters are initialized for the number of permutations N (block 928) and number of feature bits M (block 930) for the image under test (e.g., the image received at block 508 of FIG. 5).

Processing continues to decision block to determine whether the value in Permutation (N,M) is set to one. If so, then processing continues to block 934, where the value of min-hash(N) is set to M. Processing continues to block 942. Otherwise, if not set to one, processing flows to decision block 936, to determine whether M is less than the maximum number of feature bits for the signature vector for the image under test. If so, processing branches to block 938, where M is incremented, and processing loops back to decision block 932. Otherwise, processing flows to block 940.

At block 940, the value for min-hash(N) is set to 1+the feature bit count. Processing then continues to decision block 942, where a determination is made whether N mod(8) is not equal to zero. If it N mod(8) is not equal to zero, then processing flows to decision block 948; otherwise, processing continues to block 944.

At block 944, as above, the min-hash value is set to (min-hash(8), min-hash(N−7) . . . min-hash(N−1)). Processing continues to decision block 946, where the min-hash value is then compared to the values in the registered table. If there is a match, processing flows returns to a calling processing. It this case, the test image matches with a registered spam image. Thus, it may be regarded that the image is spam. Otherwise, processing flows to decision block 948, where a determination is made whether N is less than the maximum number of permutations. If it is, then N is incremented, and additional testing is performed by looping back to block 930. Otherwise, no near duplicate detection of images is found, and process 800 returns to a calling process to perform other actions.

FIG. 9A-9B illustrate a pseudo-code generally showing one embodiment of an overview of a perceptron employed to generate the weighting vector for process 700 of FIG. 7. It should be noted, that other forms, code, or the like, may also be employed. Thus, the invention is not constrained to the implementation of pseudo-code so illustrated. Process 900 of FIGS. 9A-9B is directed towards employing a perceptron machine learning algorithm to automatically determine a weighting vector based on the training images.

Process 900 employs images from what is determined to be images within a same group, and images within different groups. Suppose that there are 100 positive examples or pairs of images (p1(i), p2(i)) which are in the same group, and 100 negative examples or pairs of images (n1(i), n2(i)) which are in different groups. Then, if a function feature( ) extracts feature bits (e.g., 125 bits) from an image:

Abs(feature (p1(i)−feature (p2(i)) is a positive example, and

Abs(feature (n1(i)−feature (n2(i)) is a negative example, where, abs( ) means an absolute value of each feature bit. For example:

Abs(−1, 1, 0,0,0,−1)=(1, 1, 0,0,0,1).

For the 100 positive example pairs, one may assign 1 as a correct label, where for the 100 negative example pairs, one may assign a −1 as a correct label. That is:

(1) if the bit is more correlated in the positive examples, the bit will be zero in the positive examples, and (2) if the bit is randomly correlated in the training examples, the bit will be equally zero or one in both examples.

The perceptron algorithm as illustrated in FIG. 9A-9B then provides more weight on those bits in (1) (e.g., as the more important feature bits to compare against the image under test). From the initial weights, process 900 iterates over the training images. If it correctly classifies a training image, the process goes to a next training image. Otherwise, if it fails to properly classify the training image, the weights are adjusted in the weighting vector according to the misclassified example, and the process continues to iterate until a defined amount of accuracy of classification is obtained. The result of process 900 is a weighting vector useable in weighting the min-hash approach described above. FIG. 11 shows one possible embodiment of an example weighting vector generated using a perceptron as described herein. It should be clear that the resulting weighting vector may take different values based on the training images employed. Thus, execution of process 900 may be performed at virtually any time, based on determined changes in images, user feedback, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing delivery of content over a network, comprising:
  receiving a message, wherein the message includes an image file;
  extracting the image file from the message;
  generating a signature vector from the image file, wherein the signature vector includes at least low frequency bits and intensity bits determined from the image file;
  determining a weighting vector using a machine learning mechanism on a plurality of known other image files;
  performing a weighted min-hash near duplicate detection (NDD) using the weighting vector to determine if the signature vector indicates that the image file is likely to be a spam image; and
  based on a result of the weighted min-hash NDD, selectively blocking the image file from being delivered to a destination.

2. The method of claim 1, wherein the machine learning mechanism employs a perceptron neural network algorithm to determine an importance of each bit in signature vectors associated with each of the plurality of known other image files.

3. The method of claim 1, wherein generating the signature vector further comprises:
  converting the image file from a spatial domain representation of the image file to a frequency domain representation of the image file using a discrete cosine transform to at least extract a shape of text within the image file;

applying a high-pass filter to the frequency domain representation;

performing pixel thresholding on the high-pass filtered result;

quantizing results of the pixel thresholding to compress information within the frequency domain; and extracting a determined number of low frequency bits from the quantized result; and combining the extracted low frequency bits with a defined number of intensity bits for the image file to generate the signature vector.

4. The method of claim 1, wherein determining the weighting vector using the machine learning mechanism on a plurality of known other image files further comprises: training the weighting vector based on comparisons of feature bits within training images within a group of similar images and further based on comparisons of feature bits within training images between training images across groups of different images.

5. The method of claim 1, further comprising:

receiving feedback that the image file is incorrectly identified as image spam or incorrectly identified as non-image spam;

determining a digital signature for the incorrectly identified image file; and if another image file is received that matches the digital signature, processing the image file based on a corrected identity according to the received feedback.

6. The method of claim 1, further comprising:

determining at least one physical characteristic of the image file; and if the physical characteristic indicates that statistically, the image file is unlikely to be associated with image spam, enabling the image file and message to be forwarded to a destination.

7. The method of claim 1, further comprising if the image file includes a color image, converting the color image to grayscale.

8. A network device for selectively managing delivery of messages over a network, comprising:

a transceiver to send and receive data over the network; and a processor that is operative to perform actions, including:

receiving an image file associated with a message;

if the physical characteristic indicates that statistically, the image file is unlikely to be associated with image spam, enabling the image file and message to be forwarded to a destination, otherwise performing the following actions, comprising:

generating a signature vector from the image file, wherein the signature vector includes at least low frequency bits and intensity bits from the image file;

determining a weighting vector using a machine learning mechanism on a plurality of known other image files;

performing a weighted min-hash near duplicate detection (NDD) using the weighting vector to determine if the signature vector indicates that the image file is likely to be a spam image; and based on a result of the weighted min-hash NDD selectively blocking the image file from being delivered to a destination.

9. The network device of claim 8, wherein the physical characteristic comprises at least one of the following: a dimension, a file type, a file size, or a compression ratio.

10. The network device of claim 8, wherein the processor is operative to perform actions, further comprising:

receiving feedback that the image file is incorrectly identified as image spam or incorrectly identified as non-image spam;

determining a digital signature for the incorrectly identified image file; and if another image file is received that matches the digital signature, processing the image file based on a corrected identity according to the received feedback.

11. The network device of claim 8, wherein generating the signature vector further comprises:

resizing the image file to a predetermined size;

if the image file include color, converting the image file to a grayscale image;

performing a discrete cosine transform (DCT) on the image file;

performing high-pass filtering of a result of the DCT on the image file;

performing an inverse DCT on a result of the high-pass filtering;

performing pixel thresholding on a result of the inverse DCT;

performing another DCT on a result of the pixel thresholding;

extracting a defined number of low frequency bits from a result of the other DCT; and combining the extracted low frequency bits with a defined number of intensity bits for the image file to generate the signature vector.

12. The network device of claim 8, wherein the machine learning mechanism is a neural network perceptron algorithm applied to the plurality of known other image files, wherein the plurality of known other image files includes image files identified as spam images.

13. The network device of claim 12, wherein the plurality of known other image files are organized into groups of images, based on similarities, and comparisons are made using the machine learning mechanism between the groups and within the groups to generate the weighting vector.

14. The network device of claim 8, wherein performing the weighted min-hash NDD further comprises employing random permutations of bits within signature vectors based on the weighting vector.

15. A system for use in selectively enabling delivery of content over a network, comprising:

a message server that is configured and arranged to perform actions, including:

receiving a message; and if the message includes an image file, providing the image file to an image spam detection component; and the image spam detection component being configured to perform actions, including:

generating a signature vector from the image file, wherein the signature vector includes at least low frequency bits and intensity bits from the image file;

determining a weighting vector using a machine learning mechanism on a plurality of known other image files;

performing a weighted min-hash near duplicate detection (NDD) using the weighting vector to determine if the signature vector indicates that the image file is likely to be a spam image; and based on a result of the weighted min-hash NDD selectively blocking the image file from being delivered to a destination.

16. The system of claim 15, wherein the message server is configured and arranged to perform actions, further including:
  receiving feedback that the image file is incorrectly identified as image spam or incorrectly identified as non-image spam;
  determining a digital signature for the incorrectly identified image file; and
  if another image file is received that matches the digital signature, processing the image file based on a corrected identity according to the received feedback.

17. The system of claim 15, wherein the message server is configured and arranged to perform actions, further including:
  determining at least one physical characteristic associated with the image file, including at least one of a file type, file size, or file dimension; and
  if the at least one physical characteristic statistically indicates that the image file is unlikely to be image spam, then forwarding the message with the image file towards the destination such that the image file is viewable by the recipient at the display.

18. The system of claim 15, wherein generating the signature vector further comprises:
  performing a discrete cosine transform (DCT) on the image file;
  performing high-pass filtering of a result of the DCT on the image file;
  performing an inverse DCT on a result of the high-pass filtering;
  performing pixel thresholding on a result of the inverse DCT;
  performing another DCT on a result of the pixel thresholding;
  extracting a defined number of low frequency bits from a result of the other DCT; and
  combining the extracted low frequency bits with a defined number of intensity bits for the image file to generate the signature vector.

19. The system of claim 15, wherein the machine learning mechanism employs a neural network binary classifier to determine the weighting vector based on iterating over the plurality of known other image files, and adjusting weights for each bit within the weighting vector based, in part, on a proper classification of each known other image file or a misclassification of each known other image file within the plurality of known other image files.

20. The system of claim 15, wherein selectively blocking the image file further comprises at least one of purging the message of the image file and allowing the purged message to be delivered, or blocking the message including the image file from being delivered, if the image file is determined to likely be a spam image.

* * * * *

UNITED STATES PATENT AND TRADEMARK OFFICE
CERTIFICATE OF CORRECTION

PATENT NO. : 8,055,078 B2  
APPLICATION NO. : 12/039310  
DATED : November 8, 2011  
INVENTOR(S) : Jaesik Choi et al.

Page 1 of 1

It is certified that error appears in the above-identified patent and that said Letters Patent is hereby corrected as shown below:

On the title page, item (56), under (Other Publications), in column 2, line 1, delete "Videp" and insert -- Video --, therefor.

In drawing sheet 5 of 14, figure 5, in Reference Numeral 510, line 1, delete "Recieved" and insert -- Received --, therefor.

In drawing sheet 5 of 14, figure 5, in Reference Numeral 514, line 1, delete "Recieved" and insert -- Received --, therefor.

In column 5, line 57, delete "(TSDNs)," and insert -- (ISDNs), --, therefor.

In column 5, line 61, delete "per" and insert -- further --, therefor.

In column 9, line 58, delete "(SMGL)," and insert -- (SGML), --, therefor.

In column 16, line 7, delete "DCT" and insert -- DCT. --, therefor.

In column 17, line 40, delete "ten" and insert -- then --, therefor.

In column 18, line 26, delete "Ondrej" and insert -- Ondřej --, therefor.

Signed and Sealed this  
Fifteenth Day of May, 2012

David J. Kappos  
*Director of the United States Patent and Trademark Office*